United States Patent [19]

Mihara

[11] Patent Number: 4,536,473

[45] Date of Patent: Aug. 20, 1985

[54] SILVER HALIDE PHOTOGRAPHIC LIGHT-SENSITIVE MATERIAL

[75] Inventor: Yuji Mihara, Kanagawa, Japan

[73] Assignee: Fuji Photo Film Co., Ltd., Japan

[21] Appl. No.: 659,935

[22] Filed: Oct. 11, 1984

[30] Foreign Application Priority Data

Oct. 11, 1983 [JP] Japan .................................. 58-189554

[51] Int. Cl.$^3$ ................................................ G03C 1/02
[52] U.S. Cl. ..................................... 430/575; 430/522; 430/573; 430/576; 430/584; 430/602; 430/608; 430/944
[58] Field of Search ............... 430/575, 573, 576, 584, 430/608, 602, 944, 522

[56] References Cited

U.S. PATENT DOCUMENTS

| | | | |
|---|---|---|---|
| 2,199,542 | 5/1940 | Konig | 430/584 |
| 3,488,709 | 1/1970 | Sidebotham | 430/608 |
| 3,615,613 | 10/1971 | Shiba et al. | 430/584 |
| 3,865,598 | 2/1975 | Shiba et al. | 430/575 |
| 4,046,572 | 9/1977 | Hinata et al. | 430/584 |
| 4,430,426 | 2/1984 | Beebe et al. | 430/608 |

*Primary Examiner*—J. Travis Brown
*Attorney, Agent, or Firm*—Sughrue, Mion, Zinn, Macpeak, and Seas

[57] ABSTRACT

A silver halide photographic light-sensitive material comprising a support having thereon a silver halide emulsion layer which comprises silver halide grains containing at least silver chloride and spectrally sensitized to infrared rays with at least one dye selected from a tricarbocyanine dye and a dicarbocyanine dye having a 4-quinoline nucleus, wherein the silver halide emulsion layer contains from 0.0003 mol to 0.01 mol per mol of silver of a water-soluble bromide.

The silver halide photographic light-sensitive material has high sensitivity in an infrared spectral region which does not substantially change during the preservation of the photographic light-sensitive material.

32 Claims, No Drawings

SILVER HALIDE PHOTOGRAPHIC LIGHT-SENSITIVE MATERIAL

FIELD OF THE INVENTION

The present invention relates to a silver halide photographic light-sensitive material spectrally sensitized in an infrared region and, more particularly, to a silver halide photographic light-sensitive material having improved sensitivity in an infrared spectral region and improved preservability.

BACKGROUND OF THE INVENTION

As one method for imagewise exposing a photographic light-sensitive material, it is known to scan an original image and expose a silver halide photographic light-sensitive material according to the image signal obtained by the scanning to thereby form a negative or positive image in conformity with the original image. This is called the scanner method. Various recording apparatus for practicing image forming processes according to the scanner method are known. As a light source for recording in recording apparatus according to these scanner methods, a glow tube, a xenon lamp, a mercury lamp, a tungsten lamp, a light-emitting diode, etc., have been employed. However, all of these light sources have the practical defect that they provide a weak output and possess a short life. As a light source for the scanner methods removing these defects, there are coherent lasers such as an Ne-He laser, an argon laser, an He-Cd laser or the like. These light sources can provide a high output, but have the defects that they are of large size, expensive, and require use of a modulation device and that they limit safelight of light-sensitive materials due to the use of visible light, thus having poor handling properties.

On the other hand, scanners using semiconductor lasers have the merits that the light source is of small size, inexpensive, permits modulation with ease, and possesses a longer life than the above-described lasers, and that, since the semiconductor emits infrared rays, light-sensitive materials with sensitivity in an infrared region permits use of a bright safe light. Thus, such scanners provide improved handling properties of light-sensitive materials. However, the above-described excellent properties of semiconductor lasers have not been utilized due to the absence of light-sensitive materials having high sensitivity in an infrared region and having excellent preservability.

As commercially available light-sensitive materials with sensitivity in an infrared region, there is, for example, HIE135-20 made by Eastman Kodak Co. However, it is well known that these light-sensitive materials are unstable in sensitivity and require special caution for preservation thereof. For example, a catalogue of HIE135-20 indicates that the light-sensitive material should be stored in a freezer or refrigerator.

As one technique in producing photographic light-sensitive materials, a spectrally sensitizing technique is known which involves adding a certain kind of cyanine dye to a silver halide photographic emulsion to thereby expand the light-sensitive wavelength region of the light-sensitive material to a longer wavelength side. This technique is known to be applicable not only to a visible region but to an infrared region as well. For optical sensitization in an infrared region, sensitizing dyes which absorb infrared light are used. Examples thereof are described in, for example, Mees, *The Theory of the Photographic Process*, 3rd Ed. (MacMillan, 1966), pp. 198-201. With the above-described infrared-sensitive materials, optical sensitivity, or sensitivity to infrared light, is desirably high, and less change in sensitivity during storage occur. For this purpose, many sensitizing dyes have so far been developed.

Examples of such dyes are described in, for example, U.S. Pat. Nos. 2,095,854, 2,095,856, 2,955,939, 3,482,978, 3,552,974, 3,573,921, 3,582,344, etc. However, those sensitizing dyes which are described in these patents do not provide enough sensitivity and preservability.

On the other hand, addition of a certain kind of a specifically selected second organic compound to a light-sensitive material in addition to the spectrally sensitizing dye sometimes remarkably raises the optical sensitivity. This is known as a supersensitizing effect. In general, addition of a second organic compound or an inorganic substance does not increase, or rather decreases, sensitivity. Therefore, the supersensitization can be said to be a specific phenomenon, and selection of the sensitizing dye and the second organic compound or inorganic substance to be combined with each other is remarkably restricted. Thus, an apparently slight difference in chemical structure can lead to such a great influence on the supersensitization effect that the supersensitizing combination is not predictable from chemical structure alone.

As the second organic compounds for supersensitization which are conventionally known, there are illustrated, for example, triazine derivatives as described in U.S. Pat. Nos. 2,875,058 and 3,695,888, mercapto compounds as described in U.S. Pat. No. 3,457,078, thiourea compounds as described in U.S. Pat. No. 3,458,318, and pyrimidine derivatives as described in U.S. Pat. No. 3,615,632. U.S. Pat. No. 4,011,083 describes effecting infrared sensitization using an azaindene compound and a desensitizing amount of an infrared-sensitizing dye.

However, the techniques described in these patents are still insufficient, though they truly increase infrared sensitivity and some of them provide somewhat improved preservability. Thus, a supersensitizing technique providing improved infrared sensitivity and improved preservability has been desired.

On the other hand, an emulsion in a solution state before being coated is generally liable to undergo change in sensitivity and fogging due to, particularly, removal, desorption or decomposition of the sensitizing dye. Such changes in photographic properties of an emulsion before coating are a critical problem in the production of light-sensitive materials. However, conventionally known stabilizers such as 1-phenyl-5-mercaptotetrazole are not effective for improving stability of an infrared-sensitizing dye-containing emulsion having been changed into sol for coating.

Further, in order to reduce vagueness of images due to infrared ray exposure, it is necessary to employ a dye which has substantially an absorption in the infrared region of 750 nm or longer in wavelength for the purpose of preventing halation and/or irradiation. However, in the case of utilizing such a dye it is often encountered that not only the infrared sensitivity is decreased but also desensitization or fog formation occurs during the preservation of the photographic light-sensitive material. Therefore, it is desired that photographic light-sensitive materials in which a dye having an absorption range of 750 nm or longer in wavelength is used have sufficiently high infrared sensitivity and do not cause the change in sensitivity or fog formation during preservation.

SUMMARY OF THE INVENTION

An object of the present invention is to provide a silver halide photographic emulsion having high sensitivity to infrared rays.

Another object of the present invention is to provide a silver halide photographic emulsion which undergoes substantially no change in sensitivity during preservation and which has high sensitivity to infrared rays in a photographic light-sensitive material having a silver halide photographic emulsion layer spectrally sensitized with a tricarbocyanine dye and/or a dicarbocyanine dye having a 4-quinoline nucleus.

A further object of the present invention is to provide a silver halide photographic light-sensitive material comprising a silver halide photographic emulsion spectrally sensitized with a tricarbocyanine dye and/or a dicarbocyanine dye having a 4-quinoline nucleus, and the photographic light-sensitive material which undergoes less change in sensitivity and less formation of fog in a solution state before being coated and which has high sensitivity to infrared rays.

A still further object of the present invention is to provide a method for production of a silver halide photographic emulsion which undergoes substantially no change in sensitivity during preservation and which has hard tone and high sensitivity in a photographic light-sensitive material comprising a silver halide photographic emulsion spectrally sensitized with a tricarbocyanine dye and/or a dicarbocyanine dye having a 4-quinoline nucleus.

Other objects of the present invention will become apparent from the following detailed description and examples.

The above-described objects of the present invention have been attained by incorporating, in a photographic emulsion comprising silver halide grains containing at least silver chloride and being spectrally sensitized to infrared rays with at least one dye selected from a tricarbocyanine dye and/or a dicarbocyanine dye having a 4-quinoline nucleus, a water-soluble bromide in an amount from 0.0003 mol to 0.01 mol per mol of silver after chemical ripening of the photographic emulsion.

DETAILED DESCRIPTION OF THE INVENTION

The method for increasing the sensitivity according to the present invention by the incorporation of a water-soluble bromide which brings the decrease in silver ion concentration, is very surprising when considering heretofore known methods wherein the increase in sensitivity can be achieved by an increase in the silver ion concentration as described in *Photogr. Sci. Eng.*, Vol. 16, page 413 (1972), etc.

As the silver halide to be used in the present invention, any of silver halide which contains silver chloride, for example, silver chloride, silver chlorobromide, silver chloroiodide, silver chloroiodobromide, etc., may be employed. The amount of silver iodide in the silver halide is preferably from 0 mol% to 2 mol% and more particularly from 0 mol% to 1 mol%. The amount of silver chloride in the silver halide is preferably at least 1 mol%, more preferably at least 10 mol%, and particularly preferably from 25 mol% to 100 mol%.

These silver halide grains may be coarse grains, fine grains or a mixture thereof. A silver halide emulsion having a mean diameter of silver halide grains (measured by, for example, a projected area method in terms of number average value) ranging from about $0.04\mu$ to about $4\mu$ and particularly $0.7\mu$ or less and a so-called monodispersed type is preferred.

Further, the silver halide grains may have a uniform crystal structure or a layered structure in which the inner portion and the outer portion have different properties, or may be of a so-called conversion type as described in British Pat. No. 635,841 and U.S. Pat. No. 3,622,318. In addition, they may be of the type forming a latent image mainly on the surface thereof or of the type forming a latent image in an inner portion of the grains.

In the step of forming silver halide grains, a silver halide solvent may be used for controlling the growth of the grains. Examples of the silver halide solvent include ammonia, potassium rhodanide, ammonium rhodanide, thioether compounds (e.g., those described in U.S. Pat. Nos. 3,271,157, 3,574,628, 3,704,130, 4,297,439 and 4,276,374, etc.), thione compounds (e.g., those described in Japanese Patent Application (OPI) Nos. 144319/78, 82408/75 and 77737/80, etc.), amine compounds (e.g., those described in Japanese Patent Application (OPI) No. 100717/79), etc. (The term "OPI" as used herein means a "published unexamined Japanese patent application").

In addition, a water-soluble rhodium salt and/or water-soluble iridium salt may be added upon, before, during, or after formation of silver halide grains.

To the silver halide photographic emulsion is applied a commonly employed chemical sensitization such as gold sensitization (e.g., U.S. Pat. Nos. 2,540,085, 2,597,876, 2,597,915 and 2,399,083, etc.), sensitization with a group VIII metal ion (e.g., U.S. Pat. Nos. 2,448,060, 2,540,086, 2,566,245, 2,566,263 and 2,598,079, etc.), sulfur sensitization (e.g., U.S. Pat. Nos. 1,574,944, 2,278,947, 2,440,206, 2,521,926, 3,021,215, 3,038,805, 2,410,689, 3,189,458, 3,415,649 and 3,635,717, etc.), reduction sensitization (e.g., U.S. Pat. Nos. 2,518,698, 2,419,974 and 2,983,610, *Research Disclosure*, Vo. 176 (December, 1978), RD-17643, item III, etc.), sensitization with thioether compounds (e.g., U.S. Pat. Nos. 2,521,926, 3,021,215, 3,038,805, 3,046,129, 3,046,132, 3,046,133, 3,046,134, 3,046,135, 3,057,724, 3,062,646, 3,165,552, 3,189,458, 3,192,046, 3,506,443, 3,671,260, 3,574,709, 3,625,697, 3,635,717 and 4,198,240, etc.) or a combination thereof.

As specific chemical sensitizing agents, there are illustrated sulfur sensitizing agents (e.g., allyl thiocarbamide, thiourea, thiosulfate, thioether, cystine, etc.), noble metal sensitizing agents (e.g., potassium chloroaurate, aurous thiosulfate, potassium chloropalladate, etc.), and reduction sensitizers (e.g., tin chloride, phenylhydrazine, reductone, etc.).

The water-soluble bromide which can be used in the present invention includes various compounds capable of dissociating to a bromine ion in water. For example, a salt of bromide such as ammonium bromide, potassium bromide, sodium bromide, lithium bromide, etc., can be employed. Also, an appropriate organic bromide, for example, tetraethylammonium bromide, ethyl pyridinium bromide, etc., can be used. Among salts of bromide, however, cadmium bromide and zinc bromide, etc., are poisonous when they are excessively absorbed into the human body. Therefore, harmless water-soluble bromides are preferred as described above.

An amount of the water-soluble bromide to be added to the silver halide emulsion is an amount sufficient to substantially increase the sensitivity of the emulsion and/or to substantially prevent any change in sensitivity with the passage of time. The amount of water-soluble bromide can be varied in a wide range and, particularly, preferred results can be obtained when the bromide is added in a range from 0.0003 mol to 0.01 mol per mol of silver. More preferred results can be obtained when the bromide is added in a range from 0.0005 mol to 0.005 mol per mol of silver. The amount of bromide described above is an amount to be added to an amount of an anion in the sensitizing dye, when the anion in the sensitizing dye is bromine or bromide.

Of the tricarbocyanine dyes which can be used in the present invention, particularly useful compounds can be represented by the following general formula (Ia) or (Ib):

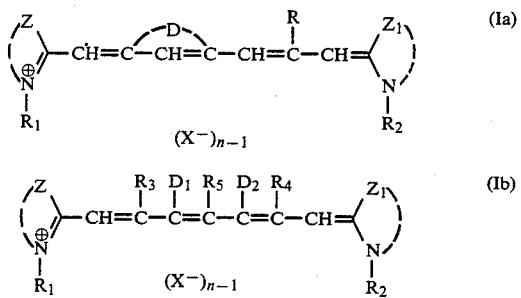

wherein $R_1$ and $R_2$, which may be the same or different, each represents an alkyl group (preferably containing from 1 to 8 carbon atoms, e.g., a methyl group, an ethyl group, a propyl group, a butyl group, a pentyl group, a heptyl group, etc.) or a substituted alkyl group preferably containing 6 or less carbon atoms in the alkyl moiety (substituted with, for example, a carboxy group, a sulfo group, a cyano group, a halogen atom (e.g., a fluorine atom, a chlorine atom, a bromine atom, etc.), a hydroxy group, an alkoxycarbonyl group (containing 8 or less carbon atoms, e.g., a methoxycarbonyl group, an ethoxycarbonyl group, a benzyloxycarbonyl group, etc.), an alkoxy group (containing 7 or less carbon atoms, e.g., a methoxy group, an ethoxy group, a propoxy group, a butoxy group, a benzyloxy group, etc.), an aryloxy group (e.g., a phenoxy group, a p-tolyloxy group, etc.), an acyloxy group (containing 3 or less carbon atoms, e.g., an acetyloxy group, a propionyloxy group, etc.), an acyl group (containing 8 or less carbon atoms, e.g., an acetyl group, a propionyl group, a benzoyl group, a mesyl group, etc.), a carbamoyl group (e.g., a carbamoyl group, an N,N-dimethylcarbamoyl group, a morpholinocarbamoyl group, a piperidinocarbamoyl group, etc.), a sulfamoyl group (e.g., a sulfamoyl group, an N,N-dimethylsulfamoyl group, a morpholinosulfonyl group, etc.), an aryl group (e.g., a phenyl group, a p-hydroxyphenyl group, a p-carboxyphenyl group, a p-sulfophenyl group, an α-naphthyl group, etc.), or the like, provided that the alkyl group may be substituted with two or more of the substituents as listed above).

R represents a hydrogen atom, a methyl group, a methoxy group or an ethoxy group.

$R_3$ and $R_4$, which may be the same or different, each represents a hydrogen atom, a lower alkyl group (e.g., a methyl group, an ethyl group, a propyl group, etc.), a lower alkoxy group (e.g., a methoxy group, an ethoxy group, a propoxy group, a butoxy group, etc.), a phenyl group or a benzyl group.

$R_5$ represents a hydrogen atom, a lower alkyl group (e.g., a methyl group, an ethyl group, a propyl group, etc.), a lower alkoxy group (e.g., a methoxy group, an ethoxy group, a propoxy group, a butoxy group, etc.), a phenyl group, a benzyl group or

wherein $W_1$ and $W_2$ each represents a substituted or unsubstituted alkyl group (containing from 1 to 18 carbon atoms, preferably from 1 to 4 carbon atoms in the alkyl moiety, e.g., a methyl group, an ethyl group, a propyl group, a butyl group, a benzyl group, a phenylethyl group, etc.) or a substituted or unsubstituted aryl group (e.g., a phenyl group, a naphthyl group, a tolyl group, a p-chlorophenyl group, etc.) or $W_1$ and $W_2$ may be bonded to each other to form a 5-membered or 6-membered nitrogen-containing heterocyclic ring.

D represents atoms necessary for completing a divalent ethylene bond, for example, an ethylene group, a triethylene group, etc., and the ethylene bond may be substituted with one, two or more appropriate substituents, for example, an alkyl group containing from 1 to 4 carbon atoms (e.g., a methyl group, an ethyl group, a propyl group, an isopropyl group, a butyl group, etc.), a halogen atom (e.g., a chlorine atom, a bromine atom, etc.), an alkoxy group (containing from 1 to 4 carbon atoms, e.g., a methoxy group, an ethoxy group, a propoxy group, an isopropoxy group, a butoxy group, etc.), or the like.

$D_1$ and $D_2$ each represents a hydrogen atom or $D_1$ and $D_2$ may be bonded to each other to form a divalent ethylene bond having the same meaning as defined for D above.

Z and $Z_1$ each represents non-metallic atoms necessary for completing a 5-membered or 6-membered nitrogen-containing heterocyclic ring such as a thiazole nucleus (for example, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-carboxybenzothiazole, 5-ethoxycarbonylbenzothiazole, 5-phenethylbenzothiazole, 5-fluorobenzothiazole, 5-trifluoromethylbenzothiazole, 5,6-dimethylbenzothiazole, 5-hydroxy-6-methylbenzothiazole, tetrahydrobenzothiazole, 4-phenylbenzothiazole, naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3-d]thiazole, etc.), a selenazole nucleus (for example, benzoselenazole, 5-chlorobenzoselenazole, 5-methoxybenzoselenazole, 5-methylbenzoselenazole, 5-hydroxybenzoselenazole, naphtho[2,1-d]selenazole, naphtho[1,2-d]selenazole, etc.), an oxazole nucleus (for example, benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-trifluorobenzoxazole, 5-hydroxybenzoxazole, 5-carboxybenzoxazole, 6-methylbenzoxazole, 6-chlorobenzoxazole, 6-methoxybenzoxazole, 6-hydroxybenzoxazole, 4,6-dimethylbenzoxazole, 5-ethoxybenzoxazole, naphtho[2,1-d]oxazole, naphtho[1,2-d]oxazole, naphtho[2,3-d]oxazole, etc.), a quinoline nucleus (for example, 2-quinoline, 3-methyl-2-quinoline, 5-ethyl-2-quinoline, 6-methyl-2-quinoline, 8-fluoro-2-quinoline, 6-methoxy-2-quinoline, 6-hydroxy-2-quinoline, 8-chloro-2-quinoline, 8-fluoro-4-quinoline, etc.), a 3,3-dialkylindolenine nucleus (for example, 3,3-dimethylindolenine, 3,3-diethylindolenine, 3,3-dimethyl-5-cyanoindolenine, 3,3-dimethyl-5-methoxyindolenine, 3,3-dimethyl-5-methylindolenine, 3,3-dimethyl-5-chloroindolenine, etc.), an imidazole nucleus (for example, 1-methylbenzimidazole, 1-ethylbenzimidazole, 1-methyl-5-chlorobenzimidazole, 1-ethyl-5-chlorobenzimidazole, 1-methyl-5,6-dichlorobenzimidazole, 1-ethyl-5,6-dichlorobenzimidazole, 1-alkyl-5-methoxybenzimidazole, 1-methyl-5-cyanobenzimidazole, 1-ethyl-5-cyanobenzimidazole, 1-methyl-5-fluorobenzimidazole, 1-ethyl-5-fluorobenzimidazole, 1-phenyl-5,6-dichlorobenzimidazole, 1-allyl-5,6-dichlorobenzimidazole, 1-allyl-5-chlorobenzimidazole, 1-phenylbenzimidazole, 1-phenyl-5-chlorobenzimidazole, 1-methyl-5-trifluoromethylbenzimidazole, 1-ethyl-5-trifluoromethylbenzimidazole, 1-ethylnaphtho[1,2-d]imidazole, etc.), a pyridine nucleus (for example, pyridine, 5-methyl-2-pyridine, 3-methyl-4-pyridine, etc.), etc. Of these, a thiazole nucleus and an oxazole nucleus are advantageously used, with a benzothiazole nucleus, a naphthothiazole nucleus, a naphthoxazole nucleus and a benzoxazole nucleus being more preferably used.

X represents an acid anion.

n represents 1 or 2.

Of the dicarbocyanine dyes having a 4-quinoline nucleus which can be used in the present invention, particularly useful compounds can be represented by the following general formula (II):

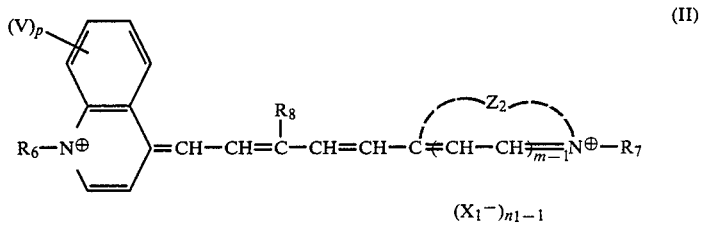

wherein $R_6$ and $R_7$ each has the same meaning as defined for $R_1$ or $R_2$.

$R_8$ has the same meaning as defined for $R_3$, and preferably represents a lower alkyl group or a benzyl group.

V represents a hydrogen atom, a lower alkyl group (e.g., a methyl group, an ethyl group, a propyl group, etc.), an alkoxy group (e.g., a methoxy group, an ethoxy group, a butoxy group, etc.), a halogen atom (e.g., a fluorine atom, a chlorine atom, etc.), or a substituted alkyl group (e.g., a trifluoromethyl group, a carboxymethyl group, etc.).

$Z_2$ has the same meaning as defined for Z or $Z_1$.

$X_1$ has the same meaning as defined for X.

m, $n_1$ and p each represents 1 or 2.

Specific examples of the sensitizing dyes used in the present invention are set forth below, but the present invention should not be construed as being limited thereto.

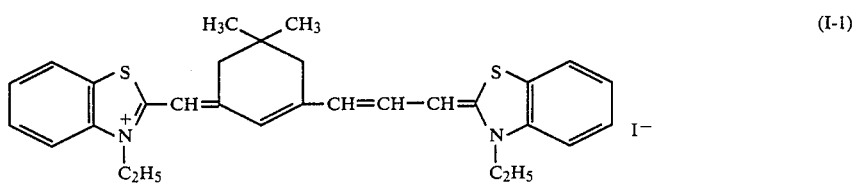

(I-1)

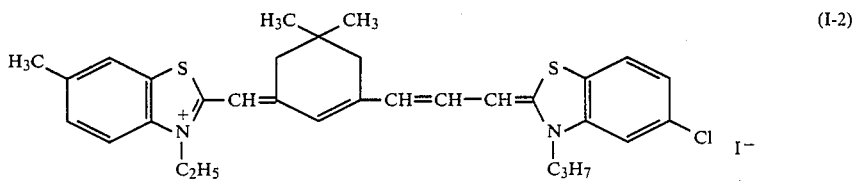

(I-2)

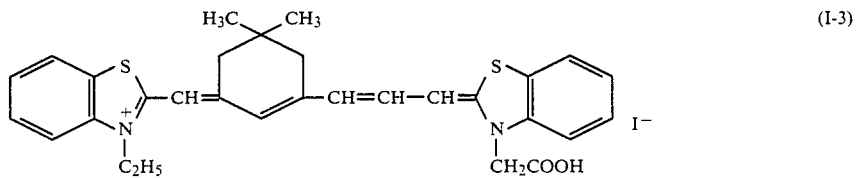

(I-3)

-continued
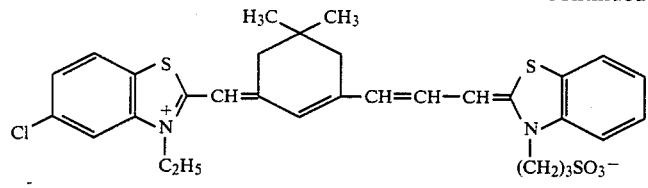
(I-4)
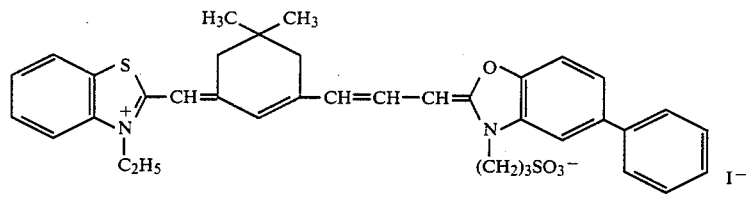
(I-5)
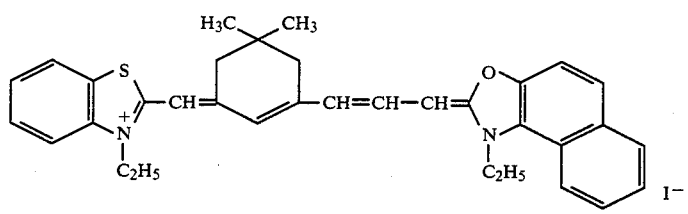
(I-6)
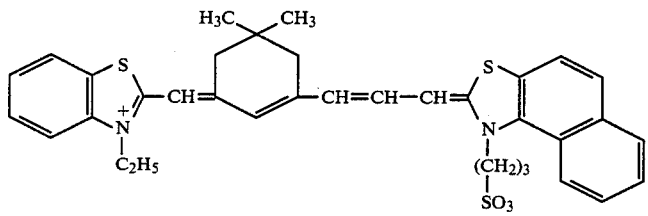
(I-7)
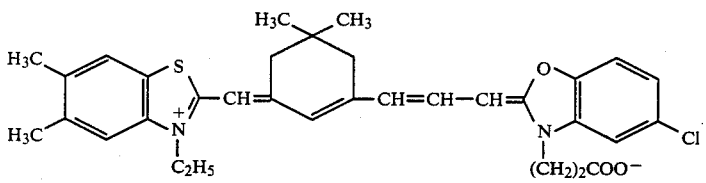
(I-8)
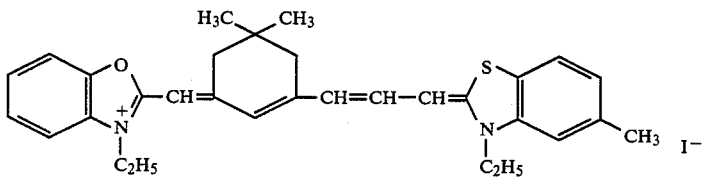
(I-9)
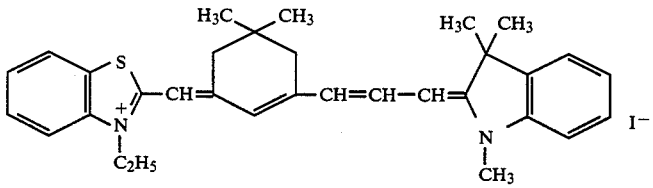
(I-10)
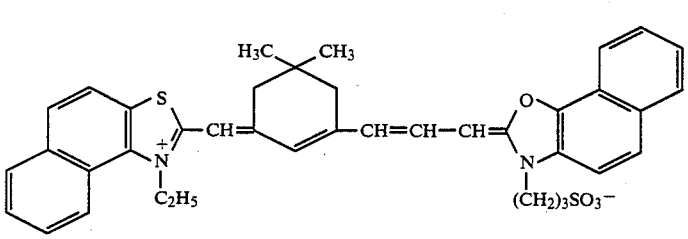
(I-11)

-continued
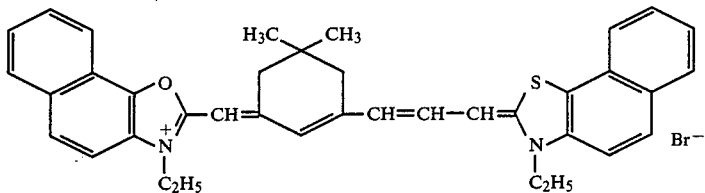 (I-12)
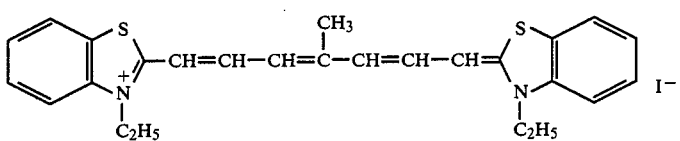 (I-13)
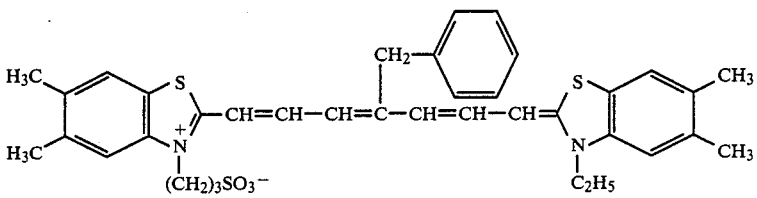 (I-14)
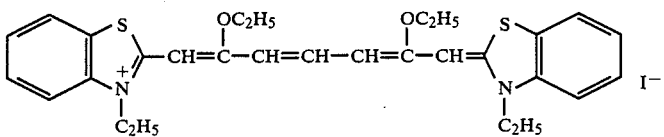 (I-15)
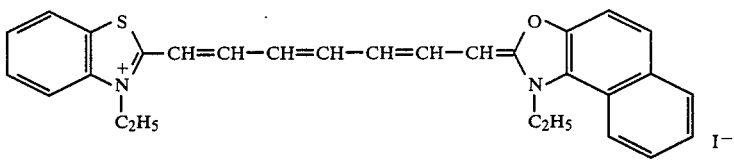 (I-16)
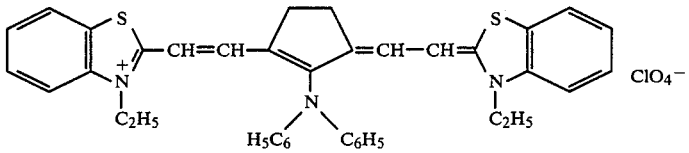 (I-17)
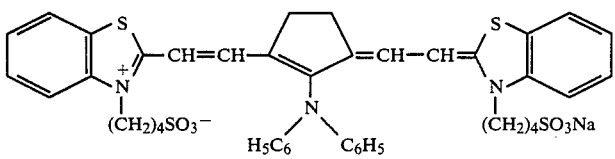 (I-18)
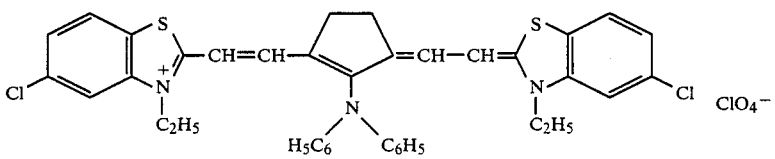 (I-19)
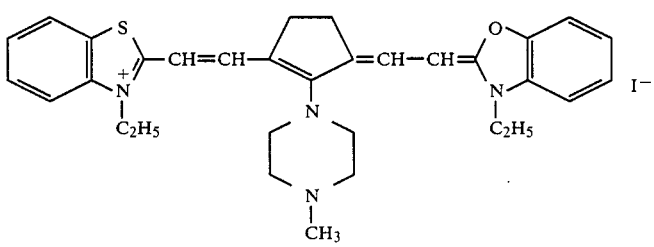 (I-20)

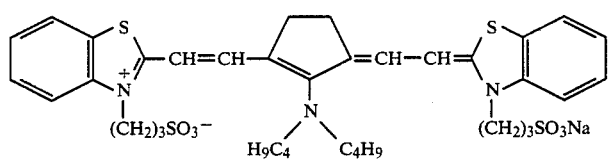 (I-21)
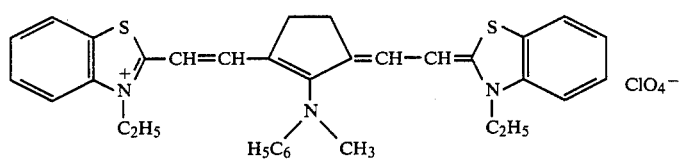 (I-22)
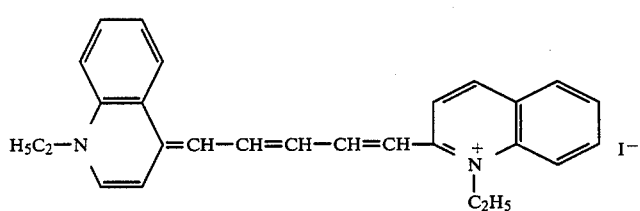 (II-1)
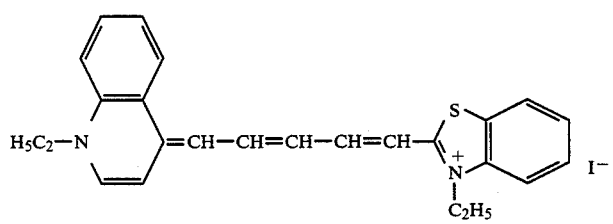 (II-2)
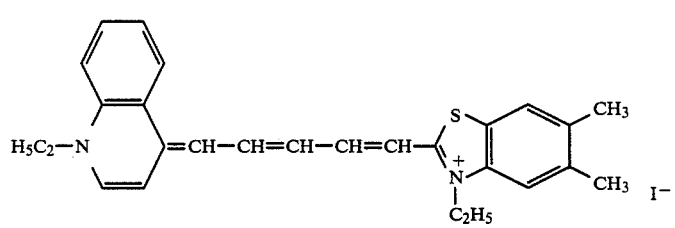 (II-3)
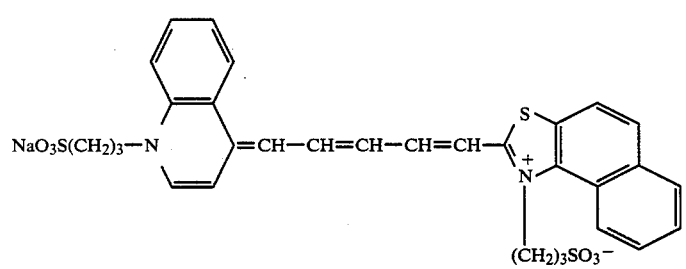 (II-4)
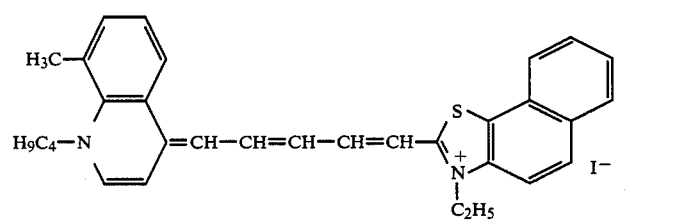 (II-5)

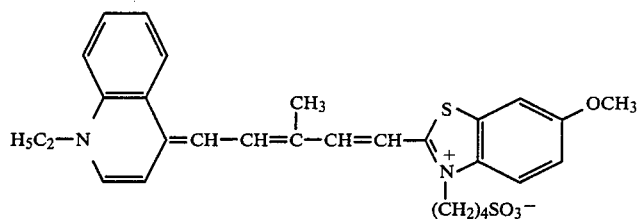
(II-6)
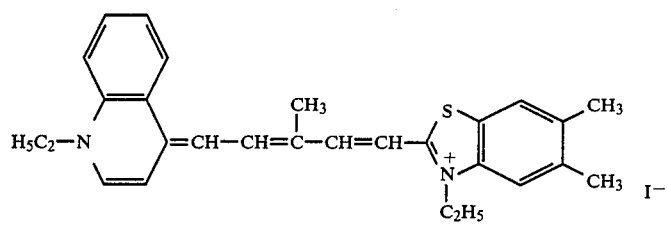
(II-7)
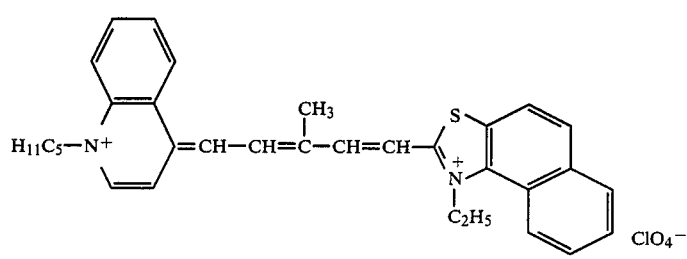
(II-8)
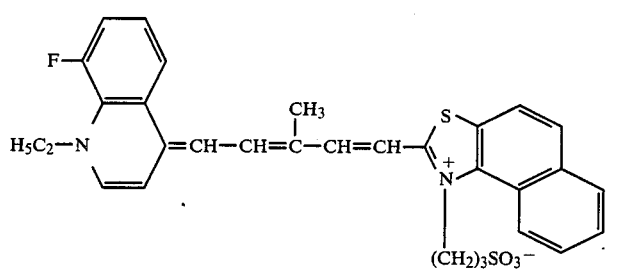
(II-9)
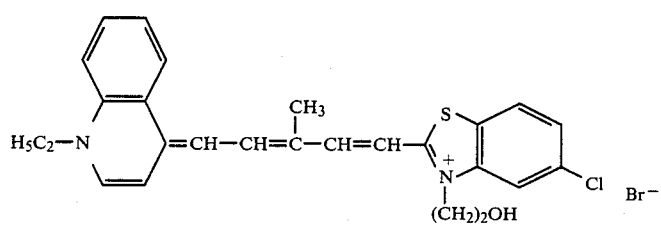
(II-10)
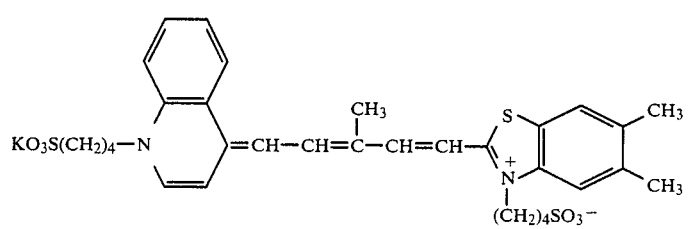
(II-11)

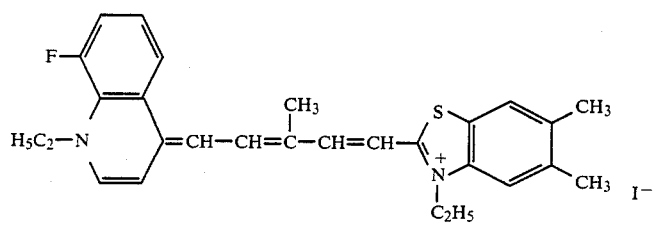
(II-12)
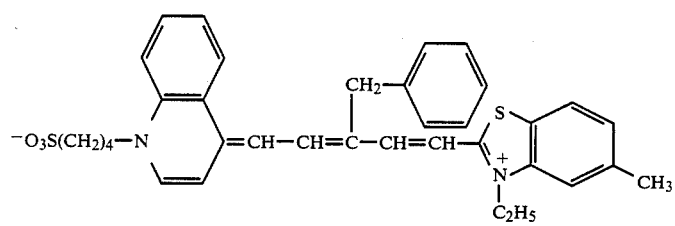
(II-13)
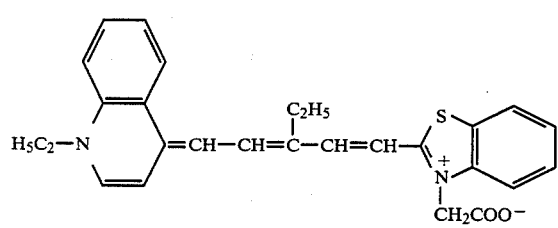
(II-14)
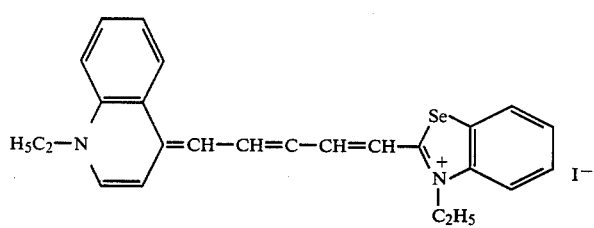
(II-15)
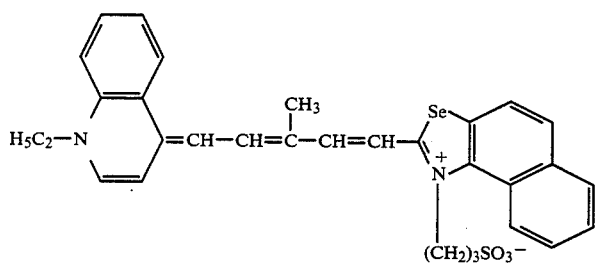
(II-16)
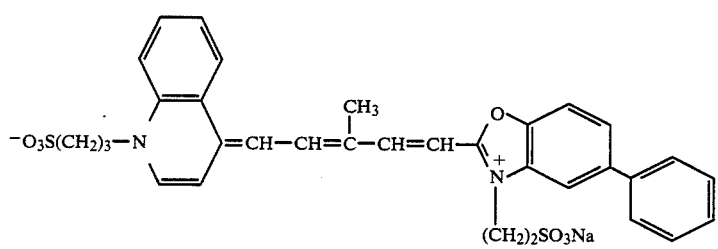
(II-17)

-continued

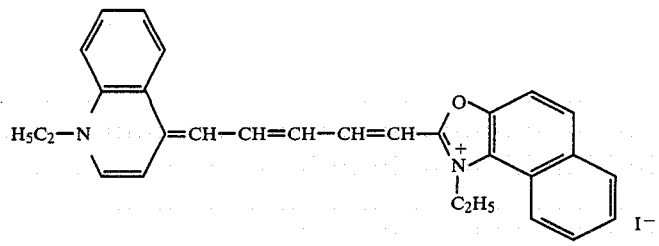
(II-18)

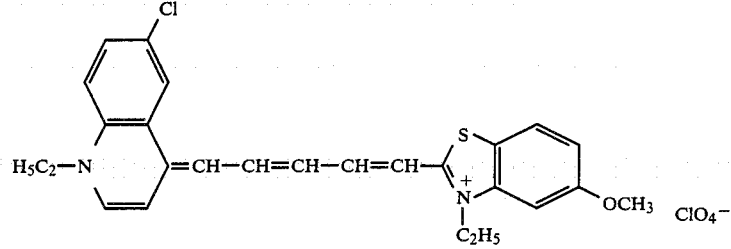
(II-19)

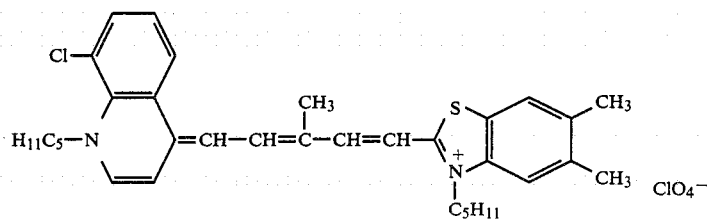
(II-20)

The infrared-sensitizing dye used in the present invention is incorporated in a silver halide photographic emulsion in a content of $5\times10^{-7}$ mol to $5\times10^{-3}$ mol, preferably $1\times10^{-6}$ mol to $1\times10^{-3}$ mol, more preferably $2\times10^{-6}$ mol to $5\times10^{-4}$ mol, per mol of silver halide.

The infrared-sensitizing dyes to be used in the present invention can be directly dispersed in an emulsion. Alternatively, they may be first dissolved in a suitable solvent such as methyl alcohol, ethyl alcohol, methyl cellosolve, acetone, water, pyridine, or a mixture thereof to add them to an emulsion as a solution. Ultrasonic waves can be applied to the dissolving step. As a process for adding the infrared-sensitizing dye to an emulsion, there is employed a process of dissolving the dye in a volatile organic solvent, dispersing the resulting solution in a hydrophilic colloid, and adding this dispersion to an emulsion as described in U.S. Pat. No. 3,469,987; a process of dispersing a water-insoluble dye in an aqueous solution without dissolution, and adding the resulting dispersion to an emulsion as described in Japanese Patent Publication No. 24185/71; a process of dissolving the dye in a surface active agent and adding the resulting solution to an emulsion as described in U.S. Pat. No. 3,822,135; a process of dissolving the dye using a compound capable of effecting a red shift, and adding the resulting solution to an emulsion as described in Japanese Patent Application (OPI) No. 74624/76; or a process of dissolving the dye in a substantially waterfree acid, and adding the resulting solution to an emulsion as described in Japanese Patent Application (OPI) No. 80826/75. In addition, those processes which are described in U.S. Pat. Nos. 2,912,343, 3,342,605, 2,996,287 and 3,429,835, etc., can be employed for adding the dye to an emulsion. The aforesaid infrared-sensitizing dyes may be uniformly dispersed in a silver halide emulsion prior to coating on a suitable support. Of course, this dispersing procedure may be conducted in any step of preparing the silver halide emulsion.

The sensitizing dye according to the present invention may be used in combination with other sensitizing dye. For example, those sensitizing dyes which are described in U.S. Pat. Nos. 3,703,377, 2,688,545, 3,397,060, 3,615,635 and 3,628,964, British Pat. Nos. 1,242,588 and 1,293,862, Japanese Patent Publication Nos. 4936/68, 14030/69 and 10773/68, U.S. Pat. No. 3,416,927, Japanese Patent Publication No. 4930/68, U.S. Pat. Nos. 3,615,613, 3,615,632, 3,617,295 and 3,635,721, etc., can be used.

In the present invention, a compound represented by the general formula (III) described below can be employed for the purpose of further increasing supersensitizing effect and/or the purpose of further improving preservability.

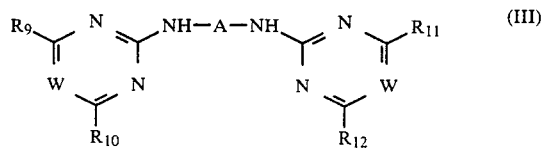
(III)

wherein —A— represents a divalent aromatic residue which may have a group of $SO_3M$ (wherein M represents a hydrogen atom or a cation capable of imparting water solubility (e.g., sodium or potassium)).

Useful examples of —A— include, for example, —$A_1$— and —$A_2$— illustrated below, provided that, where $R_9$, $R_{10}$, $R_{11}$ and $R_{12}$ do not have —$SO_3M$, —A— is selected from —$A_1$—.

—A₁—:

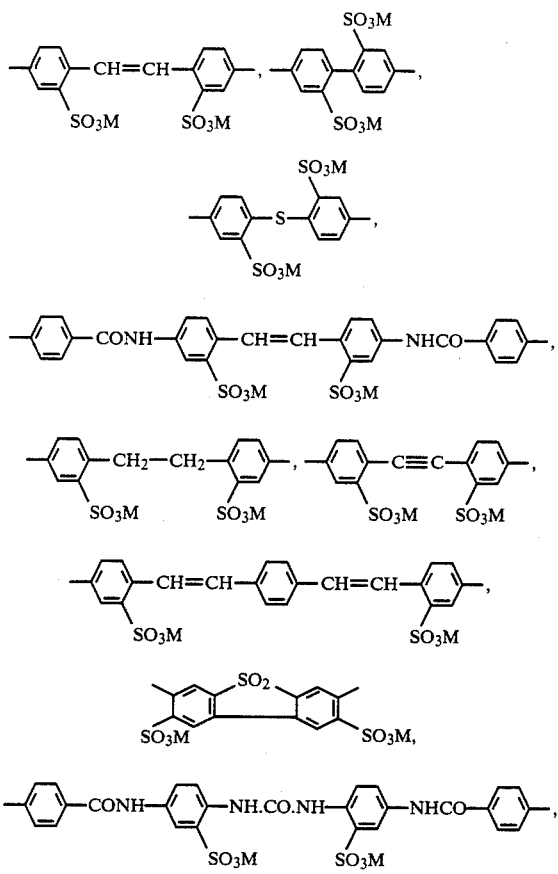

etc. In the above-described formulae M represents a hydrogen atom or a cation capable of imparting water solubility.

—A₂—:

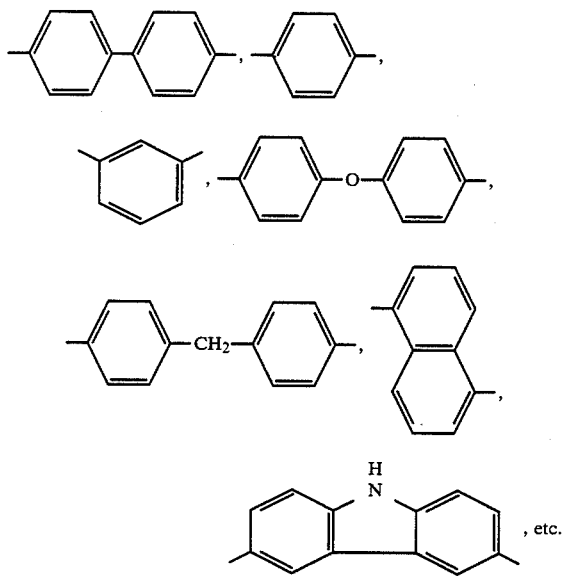

$R_9$, $R_{10}$, $R_{11}$ and $R_{12}$ each represents a hydrogen atom, a hydroxy group, a lower alkyl group (containing, preferably, 1 to 8 carbon atoms, e.g., a methyl group, an ethyl group, an n-propyl group, an n-butyl group, etc.), an alkoxy group (containing, preferably, 1 to 8 carbon atoms, e.g., a methoxy group, an ethoxy group, a propoxy group, a butoxy group, etc.), an aryloxy group (e.g., a phenoxy group, a naphthoxy group, an o-toluoxy group, a p-sulfophenoxy group, etc.), a halogen atom (e.g., a chlorine atom, a bromine atom, etc.), a heterocyclic ring nucleus (e.g., a morpholinyl group, a piperidyl group, etc.), an alkylthio group (e.g., a methylthio group, an ethylthio group, etc.), a heterocyclylthio group (e.g., a benzothiazolylthio group, a benzimidazolylthio group, a phenyltetrazolylthio group, etc.), an arylthio group (e.g., a phenylthio group, a tolylthio group, etc.), an amino group, an alkylamino group or a substituted alkylamino group (e.g., a methylamino group, an ethylamino group, a propylamino group, a dimethylamino group, a diethylamino group, a dodecylamino group, a cyclohexylamino group, a β-hydroxyethylamino group, a di(β-hydroxyethyl)amino group, a β-sulfoethylamino group, etc.), an arylamino group or a substituted arylamino group (e.g., an anilino group, an o-sulfoanilino group, an m-sulfoanilino group, a p-sulfoanilino group, an o-toluidino group, an m-toluidino group, a p-toluidino group, an o-carboxyanilino group, an m-carboxyanilino group, a p-carboxyanilino group, an o-chloroanilino group, an m-chloroanilino group, a p-chloroanilino group, a p-aminoanilino group, an o-anisidino group, an m-anisidino group, a p-anisidino group, an o-acetaminoanilino group, a hydroxyanilino group, a disulfophenylamino group, a naphthylamino group, a sulfonaphthylamino group, etc.), a heterocyclylamino group (e.g., a 2-benzothiazolylamino group, a 2-pyridylamino group, etc.), a substituted or unsubstituted aralkylamino group (e.g., a benzylamino group, an o-anisylamino group, an m-anisylamino group, a p-anisylamino group, etc.), an aryl group (e.g., a phenyl group, etc.), or a mercapto group.

$R_9$, $R_{10}$, $R_{11}$ and $R_{12}$ may be the same as or different from each other. Where —A— is selected from among group —A₂—, at least one of $R_9$, $R_{10}$, $R_{11}$ and $R_{12}$ must have one or more sulfo groups (in either free acid form or salt form).

W represents —CH= or —N=, with —CH= being preferably used.

Specific examples of the compounds represented by the general formula (III) used in the present invention are illustrated below, however, the present invention should not be construed as being limited thereto.

(III-1) Disodium 4,4'-bis[4,6-di(benzothiazolyl-2-thio)-pyrimidin-2-ylamino]stilbene-2,2'-disulfonate
(III-2) Disodium 4,4'-bis[4,6-di(benzothiazolyl-2-amino)pyrimidin-2-ylamino]stilbene-2,2'-disulfonate
(III-3) Disodium 4,4'-bis[4,6-di(naphthyl-2-oxy)pyrimidin-2-ylamino]stilbene-2,2'-disulfonate
(III-4) Disodium 4,4'-bis[4,6-di(naphthyl-2-oxy)pyrimidin-2-ylamino]bibenzyl-2,2'-disulfonate
(III-5) Disodium 4,4'-bis(4,6-dianilinopyrimidin-2-ylamino)stilbene-2,2'-disulfonate
(III-6) Disodium 4,4'-bis[4-chloro-6-(2-naphthyloxy)-pyrimidin-2-ylamino]biphenyl-2,2'-disulfonate
(III-7) Disodium 4,4'-bis[4,6-di(1-phenyltetrazolyl-5-thio)pyrimidin-2-ylamino]stilbene-2,2'-disulfonate
(III-8) Disodium 4,4'-bis[4,6-di(benzimidazolyl-2-thio)-pyrimidin-2-ylamino]stilbene-2,2'-disulfonate (III-9) Disodium 4,4'-bis(4,6-diphenoxypyrimidin-2-ylamino)stilbene-2,2'-disulfonate (III-10) Disodium 4,4'-bis(4,6-diphenylthiopyrimidin-2-ylamino)stilbene-2,2'-disulfonate (III-11) Disodium 4,4'-bis(4,6-dimercaptopyrimidin-2-ylamino)biphenyl-2,2'-disulfonate (III-12) Disodium 4,4'-bis(4,6-dianilino-triazin-2-ylamino)stilbene-2,2'-disulfonate (III-13) Disodium 4,4'-bis(4-anilino-6-hydroxy-triazin-2-ylamino)stilbene-2,2'-disulfonate (III-14) Disodium 4,4'-bis(4-naphthylamino-6-anilino-triazin-2-ylamino)stilbene-2,2'-disulfonate Of these specific examples, (III-1) to (III-12) are preferable, with (III-1), (III-2), (III-3), (III-4), (III-5) and (III-7) being particularly preferable.

The compound represented by the general formula (III) is advantageously used in amounts of about 0.01 g to about 5 g per mol of silver halide in an emulsion.

The ratio (by weight) of the infrared-sensitizing dye according to the present invention to the compound represented by the general formula (III) is advantageously in the range of from 1/1 to 1/100, particularly advantageously in the range of from 1/2 to 1/50.

The compound represented by the general formula (III) to be used in the present invention may be directly dispersed in an emulsion or may be dissolved in a suitable solvent (for example, methyl alcohol, ethyl alcohol, methyl cellosolve, water, etc.) or a mixture thereof and added as a solution to an emulsion.

Also, the compound of the general formula (III) may be added to an emulsion as a solution or a colloid dispersion prepared according to known manners employed for adding the sensitizing dye.

Further, the compound may be added to an emulsion in a manner as described in Japanese Patent Application (OPI) No. 80119/75.

In the present invention, a compound represented by the general formula (IV) described below can be further used together.

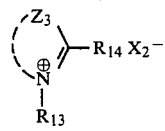

wherein $Z_3$ represents non-metallic atoms necessary for completing a 5-membered or 6-membered nitrogen-containing heterocyclic ring, examples thereof including thiazoliums (for example, thiazolium, 4-methylthiazolium, benzothiazolium, 5-methylbenzothiazolium, 5-chlorobenzothiazolium, 5-methoxybenzothiazolium, 6-methylbenzothiazolium, 6-methoxybenzothiazolium, naphtho[1,2-d]thiazolium, naphtho[2,1-d]thiazolium, etc.), oxazoliums (for example, oxazolium, 4-methyloxazolium, benzoxazolium, 5-chlorobenzoxazolium, 5-phenylbenzoxazolium, 5-methylbenzoxazolium, naphtho[1,2-d]oxazolium, etc.), imidazoliums (for example, 1-methylbenzimidazolium, 1-propyl-5-chlorobenzimidazolium, 1-ethyl-5,6-dichlorobenzimidazolium, 1-allyl-5-trichloromethyl-6-chlorobenzimidazolium, etc.), selenazoliums (for example, benzoselenazolium, 5-chlorobenzoselenazoliium, 5-methylbenzoselenazolium, 5-methoxybenzoselenazolium, naphtho[1,2-d]selenazolium, etc.), etc.

$R_{13}$ represents a hydrogen atom, an alkyl group (containing, preferably, 8 or less carbon atoms, e.g., a methyl group, an ethyl group, a propyl group, a butyl group, a pentyl group, etc.) or an alkenyl group (e.g., an allyl group).

$R_{14}$ represents a hydrogen atom or a lower alkyl group (e.g., a methyl group, an ethyl group, etc.).

$X_2$ represents an acid anion (e.g., Cl$^-$, Br$^-$, I$^-$, ClO$_4^-$, p-toluenesulfonate ion, etc.).

Preferable examples of $Z_3$ are thiazoliums, with substituted or unsubstituted benzothiazoliums or naphthothiazoliums being more advantageously used.

Specific examples of the compounds represented by the general formula (IV) are set forth below, but the present invention should not be construed as being limited thereto.

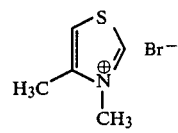
(N - 1)

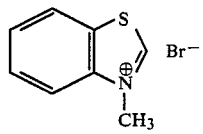
(N - 2)

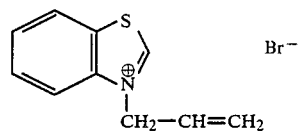
(N - 3)

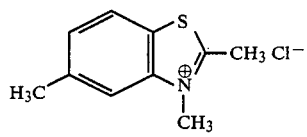
(N - 4)

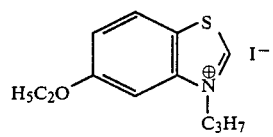
(N - 5)

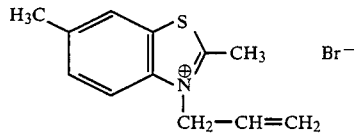
(N - 6)

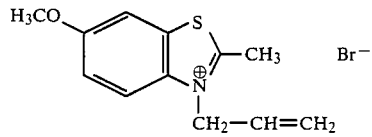
(N - 7)

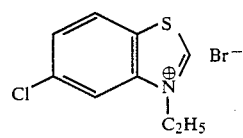
(N - 8)

-continued

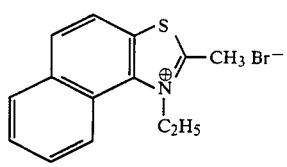 (N - 9)

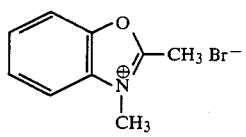 (N - 10)

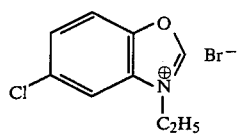 (N - 11)

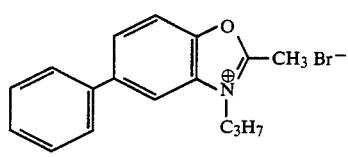 (N - 12)

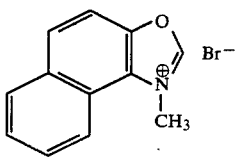 (N - 13)

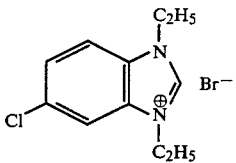 (N - 14)

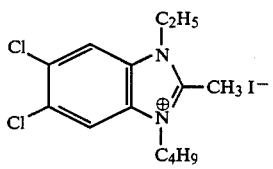 (N - 15)

 (N - 16)

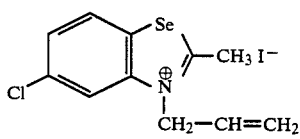 (N - 17)

-continued

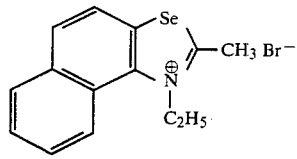 (N - 18)

The compound represented by the general formula (IV) described above is advantageously used in an amount of about 0.01 g to about 5 g per mol of silver halide in an emulsion.

The ratio (by weight) of the amount of the infrared-sensitizing dye according to the present invention (I) to the compound represented by the general formula (IV) is advantageously in the range of from 1/1 to 1/300, particularly advantageously in the range of from 1/2 to 1/50.

The compound represented by the general formula (IV) can be directly dispersed in an emulsion or may be dissolved in a suitable solvent (e.g., water, methyl alcohol, ethyl alcohol, propanol, methyl cellosolve, acetone, etc.) or in a mixture of these solvents and added as a solution to an emulsion. In addition, the compound of the general formula (IV) can be added to an emulsion as a solution or as a colloid dispersion according to the aforesaid processes for adding sensitizing dyes.

The compound represented by the general formula (IV) may be added to an emulsion before or after the addition of the sensitizing dye according to the present invention. Also, the compound of the general formula (IV) and the sensitizing dye according to the present invention may be separately dissolved, and the resulting solutions may be simultaneously added to an emulsion as separate solutions or may be mixed and added to an emulsion as a mixture solution.

As a halation preventing dye and/or irradiation preventing dye used in the present invention, an oxonol dye, a hemioxonol dye, a merocyanine dye, a cyanine dye or an azo dye, etc., each of which has substantially an absorption in a longer wavelength region of 750 nm or longer can be employed. More specifically, dyes which are represented by the general formula (Va), (Vb), (Vc) or (Vd) described below and which have substantially an absorption in a longer wavelength region of 750 nm or longer are advantageously used.

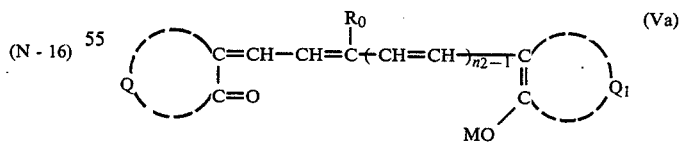 (Va)

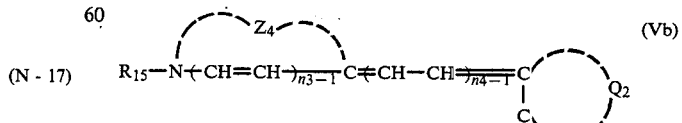 (Vb)

-continued

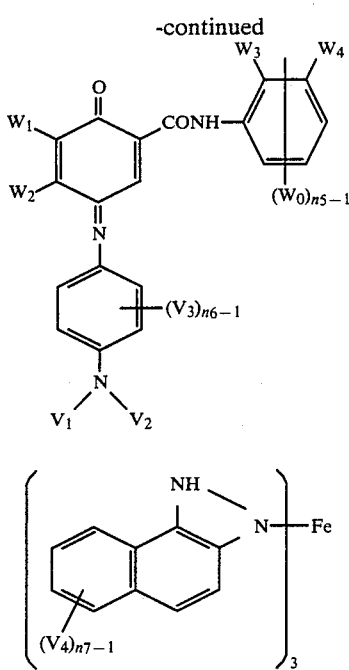

wherein Q and $Q_1$, which may be the same or different, each represents atoms necessary for completing pyrazolone, barbituric acid, thiobarbituric acid, isooxazolone, 3-oxythionaphthene or 1,3-indanedione;

$Q_2$ represents atoms necessary for completing pyrazolone, barbituric acid, thiobarbituric acid, isooxazolone, 3-oxynaphthene, 1,3-indanedione, 2-thiooxazolidione, rhodanine or thiohydantoin;

$Z_4$ represents atoms necessary for completing benzothiazole, naphthothiazole, benzoxazole or naphthoxazole;

$R_0$ represents a hydrogen atom, a halogen atom, a lower alkyl group;

$R_{15}$ represents a substituted or unsubstituted alkyl group;

$W_0$, $W_1$, $W_2$, $W_3$ and $W_4$ each represents a hydrogen atom, an alkyl group, a substituted alkyl group, a nitro group, a cyano group, a halogen atom, an alkoxy group, a sulfo group or a carboxy group, or $W_1$ and $W_2$ or $W_3$ and $W_4$ may be bonded to each other to form a benzene ring;

$V_1$, $V_2$ and $V_3$, which may be the same or different, each represents an alkyl group or a substituted alkyl group;

$V_4$ represents a sulfo group or a carboxy group;

M represents a hydrogen or a cation capable of imparting water solubility (e.g., sodium or potassium);

$n_2$ represents 2 or 3;

$n_3$ represents 1 or 2;

$n_4$ represents 3 or 4;

$n_5$ and $n_6$ each represents 1, 2 or 3; and $n_7$ represents 2, 3 or 4.

Among the dyes described above, those represented by the general formula (Vd) are particularly preferred.

In addition to the dyes represented by the above-described general formula (Va), (Vb), (Vc) or (Vd), other dyes may be employed in combination. Examples of such dyes to be used include, for example, pyrazolone oxonol dyes as described in U.S. Pat. No. 2,274,782, diaryl azo dyes as described in U.S. Pat. No. 2,956,879, styryl dyes or butadienyl dyes as described in U.S. Pat. Nos. 3,423,207 and 3,384,487, merocyanine dyes as described in U.S. Pat. No. 2,527,583, merocyanine dyes or oxonol dyes as described in U.S. Pat. Nos. 3,486,897, 3,652,284 and 3,718,472, enamino hemioxonol dyes as described in U.S. Pat. No. 3,976,661 and dyes as described in British Pat. Nos. 584,609 and 1,177,429, Japanese Patent Application (OPI) Nos. 85130/73, 99620/74 and 114420/74, U.S. Pat. Nos. 2,533,472, 3,148,187, 3,177,078, 3,247,127, 3,540,887, 3,575,704 and 3,653,905, and the like.

In addition, the silver halide photographic light-sensitive material of the present invention may contain such sensitizers as a polyoxyethylene derivative (as described in British Pat. No. 981,470, Japanese Patent Publication No. 6475/56, U.S. Pat. No. 2,716,062, etc.), a polyoxypropylene derivative, a quaternary ammonium group-containing derivative, etc.

To the photographic light-sensitive material of the present invention may be added various compounds for the purpose of preventing reduction of sensitivity and formation of fog in the step of producing, or during storage or processing of, the light-sensitive material. As such compounds, many compounds have long been known such as many heterocyclic compounds including nitrobenzimidazole, ammonium chloroplatinate, 4-hydroxy-6-methyl-1,3,3a,7-tetraazaindene, and 1-phenyl-5-mercaptotetrazole, etc., mercury-containing compounds, mercapto compounds, metal salts, etc. Some usable examples thereof are described in K. Mees, *The Theory of the Photographic Process* (3rd Ed., 1966), pages 344 to 349, referring to original literature articles. Specific examples of the compounds are: thiazolium salts as described in U.S. Pat. Nos. 2,131,038 and 2,694,716, etc.; azaindenes as described in U.S. Pat. Nos. 2,886,437 and 2,444,605; urazoles as described in U.S. Pat. No. 3,287,135, etc.; sulfocatechols as described in U.S. Pat. No. 3,236,652, etc.; oximes as described in British Pat. No. 623,448, etc.; mercaptotetrazoles as described in U.S. Pat. Nos. 2,403,927, 3,266,897 and 3,397,987, etc.; nitrons; nitroindazoles; polyvalent metal salts as described in U.S. Pat. No. 2,839,405, etc.; thiuronium salts as described in U.S. Pat. No. 3,220,839, etc.; and salts of palladium, platinum and gold as described in U.S. Pat. Nos. 2,566,263 and 2,597,915, etc.

The silver halide photographic light-sensitive material may contain a developing agent such as a hydroquinone; a catechol; an aminophenol; a 3-pyrazolidone; ascorbic acid or its derivatives; a reductone; a phenylenediamine; or a combination of these developing agents. The developing agent may be incorporated in a silver halide emulsion layer and/or other photographic layer(s) (for example, a protective layer, an interlayer, a filter layer, an antihalation layer, a backing layer, etc.). The developing agent may be added by dissolving in a suitable solvent or as a dispersion as described in U.S. Pat. No. 2,592,368 or French Pat. No. 1,505,778.

As development-accelerating agents, those compounds which are described in, for example, U.S. Pat. Nos. 3,288,612, 3,333,959, 3,345,175 and 3,708,303, British Pat. No. 1,098,748, West German Pat. Nos. 1,141,531 and 1,183,784, etc., can be used.

Emulsion-hardening processing can be conducted in a conventional manner. Examples of the hardening agents include: aldehyde type compounds such as formaldehyde and glutaraldehyde, etc.; ketone compounds such as diacetyl and cyclopentanedione, etc.; reactive halogen-containing compounds such as bis(2-chloroethylurea), 2-hydroxy-4,6-dichloro-1,3,5-triazine, and those as described in U.S. Pat. Nos. 3,288,775 and 2,732,303, British Pat. Nos. 974,723 and 1,167,207, etc.; reactive olefin-containing compounds such as divinyl-sulfone, 5-acetyl-1,3-diacryloyl-hexahydro-1,3,5-triazine, and those described in U.S. Pat. Nos. 3,635,718 and 3,232,763, British Pat. No. 994,869, etc.; N-methylol compounds such as N-hydroxymethylphthalimide and those as described in U.S. Pat. Nos. 2,732,316 and 2,586,168, etc.; isocyanates as described in U.S. Pat. No. 3,103,437; aziridine compounds as described in U.S. Pat. Nos. 3,017,280 and 2,983,611, etc.; acid derivatives as described in U.S. Pat. Nos. 2,725,294 and 2,725,295, etc.; carbodiimide compounds as described in U.S. Pat. No. 3,100,704, etc.; epoxy compounds as described in U.S. Pat. No. 3,091,537, etc.; isooxazole compounds as described in U.S. Pat. Nos. 3,321,313 and 3,543,292; halogenocarboxyaldehydes such as mucochloric acid; dioxane derivatives such as dihydroxydioxane and dichlorodioxane; and inorganic hardeners such as chromium alum, zirconium sulfate, etc. In place of these compounds, their precursors such as alkali metal bisulfite-aldehyde adducts, hydantoin methylol derivatives, and primary aliphatic nitroalcohols may be used as well.

Surfactants may be added, alone or in combination, to a photographic light-sensitive material of the present invention. They are used as coating aids but, in some cases, for other purposes such as emulsion dispersion, sensitization, improvement of photographic properties, antistatic purpose, prevention of adhesion, etc. The surfactants are categorized into: natural surfactants such as saponin; nonionic surfactants such as alkylene oxide derivatives, glycerin derivatives, glycidol derivatives, etc.; cationic surfactants such as higher alkylamines, quaternary ammonium salts, heterocyclic compounds (e.g., pyridine, etc.), phosphonium compounds, sulfonium compounds, etc.; anionic surfactants having an acidic group such as a carboxylic acid group, a sulfonic acid group, a phosphoric acid group, a sulfuric ester group or a phosphoric ester group; and amphoteric surfactants such as amino acids, aminosulfonic acids, aminoalcohol sulfuric or phosphoric esters, etc.

To the silver halide photographic emulsion to be used in the present invention may be added, as a protective colloid, an acylated gelatin such as phthaloylated gelatin or malonoylated gelatin, a cellulose compound such as hydroxyethyl cellulose or carboxymethyl cellulose, soluble starch such as dextrin, or a hydrophilic polymer such as polyvinyl alcohol, polyvinyl pyrrolidone, polyacrylamide, or polystyrenesulfonic acid, in addition to gelatin.

In the present invention, condensates between a polyalkylene oxide compound such as a polymer comprising preferably at least 10 units of alkylene oxide having 2 to 4 carbon atoms (e.g., ethylene oxide, propylene-1,2-oxide, butylene-1,2-oxide, with ethylene oxide being preferable) and a compound having at least one active hydrogen atom such as water, an aliphatic alcohol, an aromatic alcohol, a fatty acid, an organic amine, a hexitol derivative or the like, or a block copolymer of two or more, in kind, of polyalkylene oxides can be used. Specific usable examples of the polyalkylene oxide compounds include:

Polyalkylene glycols,
Polyalkylene glycol alkyl ethers,
Polyalkylene glycol aryl ethers,
Polyalkylene glycol alkylaryl ethers,
Polyalkylene glycol esters,
Polyalkylene glycol fatty acid amides,
Polyalkylene glycol amines,
Polyalkylene glycol block copolymers,
Polyalkylene glycol graft polymers, etc.

These must have a molecular weight of 600 or more.

The number of the polyalkylene oxide chains in the molecule is not limited to 1, and 2 or more chains may be present. With such compounds, each polyalkylene oxide chain may contain less than 10 alkylene oxide units, but the sum of the alkylene oxide units in the molecule must be at least 10. With compounds containing 2 or more polyalkylene oxide chains in the molecule, each polyalkylene oxide chain may contain the same alkylene oxide chain units or alkylene oxide units different from that of the other chain or chains. For example, one chain may comprise ethylene oxide units, and the other chain may comprise propylene oxide units. The polyalkylene oxide compounds to be used in the present invention preferably contain from 14 to 100 alkylene oxide units.

Specific examples of polyalkylene oxide compounds which can be used in the present invention are illustrated below:

| | |
|---|---|
| $HO(CH_2CH_2O)_{90}H$ | 1 |
| $C_4H_9O(CH_2CH_2O)_{15}H$ | 2 |
| $C_{12}H_{25}O(CH_2CH_2O)_{15}H$ | 3 |
| $C_{18}H_{37}O(CH_2CH_2O)_{15}H$ | 4 |
| $C_{18}H_{37}O(CH_2CH_2O)_{40}H$ | 5 |
| $C_8H_{17}CH{=}CHC_8H_{16}O(CH_2CH_2O)_{15}H$ | 6 |

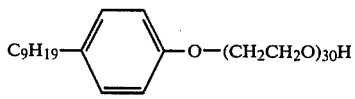

7

$$C_9H_{19}-\!\!\left\langle\!\!\bigcirc\!\!\right\rangle\!\!-O-(CH_2CH_2O)_{30}H$$

8

$$CH_3-\!\!\left\langle\!\!\bigcirc\!\!\right\rangle\!\!-O-(CH_2CH_2O)_{30}H$$

9

$$\left\langle\!\!\bigcirc\!\!\right\rangle\!\!-O-(CH_2CH_2O)_{20}H$$

| | |
|---|---|
| $C_{11}H_{23}COO(CH_2CH_2O)_{80}H$ | 10 |
| $C_{11}H_{23}COO(CH_2CH_2O)_{24}OCC_{11}H_{23}$ | 11 |

12

$$C_8H_{17}CH\!\!\begin{array}{c}\diagup COO(CH_2CH_2O)_9H\\ \diagdown COO(CH_2CH_2O)_9H\end{array}$$

$C_{11}H_{23}CONH(CH_2CH_2O)_{15}H$  13

14

$$C_{12}H_{25}N\!\!\begin{array}{c}\diagup (CH_2CH_2O)_{15}H\\ \diagdown (CH_2CH_2O)_{15}H\end{array}$$

$C_{14}H_{29}N(CH_2)(CH_2CH_2O)_{24}H$  15

16

$$\begin{array}{c}CH_2-O-CH-CH_2OC_{11}H_{23}\\ |\qquad\qquad\qquad|\\ H(OCH_2CH_2)_{14}O-CH-CH-CH-(CH_2CH_2O)_{14}H\\ |\\ O(CH_2CH_2O)_{14}H\end{array}$$

$$H(CH_2CH_2O)_a(\underset{\underset{CH_3}{|}}{CHCH_2O})_b(CH_2CH_2O)_cH \qquad 17$$

$a + b + c = = 50$

-continued b:a + c = 10:9

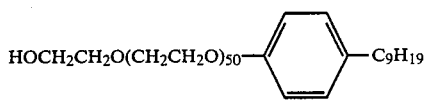    18

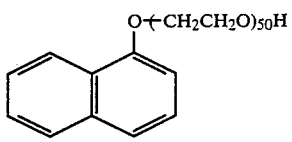    19

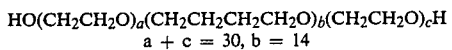    20 a + c = 30, b = 14

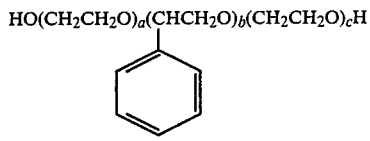    21 b = 8, a + c = 50

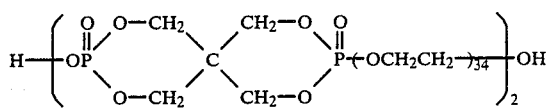    22

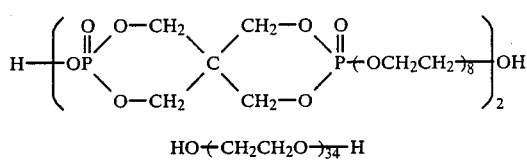    23

HO$\mathrm{\{CH_2CH_2O\}_{34}}$H

These and other polyalkylene oxide compounds as described in Japanese Patent Application (OPI) Nos. 156423/75, 108130/77 and 3217/78 can be used. These polyalkylene oxide compounds may be used alone or in combination of two or more.

In adding the polyalkylene oxide compound to a silver halide emulsion, it can be added as an aqueous solution of a suitable concentration or as an organic solution in a water-miscible organic solvent having a low boiling point at an appropriate stage before coating, preferably after chemical ripening of the silver halide emulsion. In the present invention, the polyalkylene oxide compound is desirably used in an amount of $1 \times 10^{-5}$ mol to $1 \times 10^{-2}$ mol.

Also, for the purpose of improving dimensional stability of a photographic material, film properties, etc., a polymer latex comprising a homopolymer or copolymer of alkyl acrylate, alkyl methacrylate, acrylic acid, glycidyl acrylate or the like as described in U.S. Pat. Nos. 3,411,911, 3,411,912, 3,142,568, 3,325,286 and 3,547,650, Japanese Patent Publication No. 5331/70, etc., can be incorporated in the silver halide photographic light-sensitive material.

The silver halide photographic light-sensitive material may further contain an antistatic agent, a plasticizer, a fluorescent brightening agent, an air fog-preventing agent, a toning agent, etc.

The silver halide photographic light-sensitive material of the present invention may contain color couplers such as a cyan coupler, a magenta coupler, and a yellow coupler and compounds capable of dispersing the couplers.

That is, it may contain compounds capable of forming color by oxidative coupling with an aromatic primary amine developing agent (for example, a phenylenediamine derivative or an aminophenol derivative) in color development processing. Of these couplers, nondiffusible couplers having a hydrophobic group called a ballast group in their molecules are desirable. The couplers may be of either 4-equivalent type or 2-equivalent type with respect to silver ion. Colored couplers having a color-correcting effect or couplers capable of releasing a development inhibitor upon development (called DIR couplers) may also be used.

In addition to DIR couplers, DIR coupling compounds capable of forming a colorless coupling reaction product and releasing a development inhibitor may also be incorporated.

The light-sensitive material of the present invention may be developed with a color developer containing a diffusible coupler to form a color image.

As irradiation-preventing dyes to be used depending upon end-use, there can be used those described in, for example, Japanese Patent Publication Nos. 20389/66, 3504/68 and 13168/68, U.S. Pat. Nos. 2,697,037, 3,423,207 and 2,865,752, British Pat. Nos. 1,030,392 and 1,100,546, etc.

The present invention can be applied to sensitization of silver halide emulsions to be used for various color light-sensitive materials as well as sensitization of black-and-white photographic emulsions.

The silver halide photographic emulsion is coated on a support together with, if necessary, other photographic layers. That is, the emulsion may be coated on a support by various coating methods including a dip coating method, an air knife coating method, a curtain coating method, and an extrusion coating method using a hopper as described in U.S. Pat. No. 2,681,294.

Two or more layers may be coated, if necessary, at the same time according to the methods as described in U.S. Pat. Nos. 2,761,791, 3,508,947, 2,941,898 and 3,526,528.

The finished emulsion is coated on an appropriate support. Typical flexible supports include a cellulose nitrate film, a cellulose acetate film, a cellulose acetate butyrate film, a cellulose acetate propionate film, a polystyrene film, a polyethylene terephthalate film, a polycarbonate film, a laminate thereof, a thin glass film, paper, etc., which are commonly used for photographic light-sensitive materials. Papers coated or laminated with baryta or α-olefin polymer (particularly, polymers of α-olefin having 2 to 10 carbon atoms, such as polyethylene, polypropylene, ethylene/butene copolymer, etc.) and plastic films whose surface has been made rough to improve intimate adhesive properties with other polymer substance and raise printability as described in Japanese Patent Publication No. 19068/72 can also provide good results.

As a suitable support, a transparent or opaque support is selected depending upon the end-use of the light-sensitive material. Also, with transparent supports, not only colorless, transparent ones but transparent supports colored by adding dyes or pigments can be used as well. This has heretofore been conducted with X-ray films and is described in J. SMPTE, Vol. 67, page 296 (1958), etc.

Exposure for obtaining a photographic image may be conducted in a conventional manner. That is, any of various known light sources emitting light rays including infrared rays such as natural light (sunlight), tungsten lamp, cathode ray tube flying spot, light-emitting diode, laser light (for example, gas laser, YAG laser, dye laser, semiconductor laser, etc.), etc., may be used. Also, exposure may be effected by using light emitted from a fluorescent body excited with electron beams, X-rays, gamma-rays, α-rays or the like. As to exposure time, an exposure time of 1/1,000 second to 1 second employed for an ordinary camera, an exposure time shorter than 1/1,000 second (for example, $1/10^4$ to $1/10^6$ second exposure using a xenon flash lamp or CRT), and an exposure time longer than 1 second may be employed. If necessary, the spectral composition of light rays to be used for the exposure may be adjusted by using a color filter.

The photographic light-sensitive material of the present invention is particularly suitable for using in a scanner with a semiconductor laser.

The light-sensitive material of the present invention can be photographically processed by any known processes. As processing solutions, known ones may be used. The processing temperature is selected usually between 18° C. and 50° C., but temperatures lower than 18° C. or higher than 50° C. may also be selected. Development processing for forming a silver image (black-and-white photographic processing) or color photographic processing involving a development step for forming a dye image may be applied to the light-sensitive material of the present invention depending upon the end-use.

The developing solution for effecting black-and-white photographic processing can contain known developing agents. As the developing agents, dihydroxybenzenes (e.g., hydroquinone), 3-pyrazolidones (e.g., 1-phenyl-3-pyrazolidone), aminophenols (e.g., N-methyl-p-aminophenol), 1-phenyl-3-pyrazolines, ascorbic acid, and heterocyclic compounds wherein a 1,2,3,4-tetrahydroquinoline ring is fused with an indolenine ring as described in U.S. Pat. No. 4,067,872, etc., can be used alone or in combination. Generally, the developing solution further contains known preservatives, alkali agents, pH buffers, anti-fogging agents, etc., and, if necessary, may further contain dissolving aids, toning agents, development accelerators, surfactants, defoaming agents, water-softening agents, hardeners, viscosity-imparting agents, etc.

So-called "lith-type" development processing may be applied to the photographic emulsion according to the present invention. "Lith type" development processing means a development processing unit usually a dihydroxybenzene as a developing agent and conducting development in an infectious manner at a low sulfite ion concentration for photographically reproducing line images or halftone dot images. (Detailed descriptions are given in Mason, *Photographic Processing Chemistry* (1966), pages 163 to 165.)

As a fixing solution, those which have the same formulation as are ordinarily employed can be used. As a fixing agent, organic sulfur compounds which are known to function as fixing agents can be used as well as thiosulfates and thiocyanates. The fixing solution may contain a water-soluble aluminum salt as a hardener.

In forming dye images, ordinary processes can be applied. For example, there may be employed a negative-positive process (described in, for example, *Journal of the Society of Motion Picture and Television Engineers*, Vol. 61 (1953), pages 667 to 701); a color reversal process of forming a negative silver image by developing with a developing solution containing a black-and-white developing agent, conducting at least one uniform exposure or other proper fogging processing, and subsequently conducting color development to thereby obtain a positive dye image; a silver dye-bleaching process of forming a silver image by developing a dye-containing photographic emulsion layer after imagewise exposure to thereby form a silver image, and bleaching the dye using the silver image as a bleaching catalyst; and the like.

The color developing agents are described in detail in, for example, L. F. A. Mason, *Photographic Processing Chemistry* (Focal Press, London, 1966), pages 226 to 229, etc. They may be used in combination with 3-pyrazolidones. To the color developing solution may be added, if necessary, various additives.

After development processing, the silver halide photographic emulsion is fixed in a conventional manner and, in some cases, subjected to bleaching. The bleaching may be conducted simultaneously with, or separately from, the fixing processing. Where bleaching and fixing are conducted simultaneously, the light-sensitive material is processed in a bleach-fixing bath containing both a bleaching agent and a fixing agent.

The present invention can be applied to a low-silver content light-sensitive material containing silver in an amount as low as from several tenths to 1/100 of that of ordinary light-sensitive materials.

The present invention will now be described in more detail with reference to the following examples, but the present invention should not be construed as being limited to these examples.

EXAMPLE 1

Silver halide grains were precipitated by a double jet method, physically ripened, desalted and chemically ripened to obtain a silver chloroiodobromide emulsion (containing 70 mol% of bromide and 0.1 mol% of iodide). The silver halide grains in the emulsion had a mean diameter of 0.4μ. 0.6 mol of silver halide was contained per kg of the emulsion.

1 kg portions of this emulsion were weighed and, after heating to 40° C. to dissolve, a methanol solution of a sensitizing dye and then an aqueous solution of sodium bromide were added thereto in an amount as described in Table 1 below, respectively. Then, 25 ml of a 1.0 wt% methanol solution of Compound (III-1), 30 ml of a 1.0 wt% aqueous solution of 2-hydroxy-4,6-dichlorotriazine sodium salt and 40 ml of a 1.0 wt% aqueous solution of sodium dodecylbenzenesulfonate were added thereto, followed by stirring the resulting mixture. Each of the thus finished emulsions was coated on a cellulose triacetate film base in a dry thickness of 5μ, then dried to obtain light-sensitive material samples. Each of the film samples was exposed through an optical wedge using a sensitometer containing a light source of 2,666° K. in color temperature fitted with a dark red filter (SC-66) made by Fuji Photo Film Co., Ltd. After the exposure, they were developed at 20° C. for 4 minutes using a developing solution of the formulation described below, processed in a stopping bath and a fixing bath, then washed with water to obtain strips with a predetermined black-and-white image. Density of each image was measured using a model P densitometer made by Fuji Photo Film Co., Ltd. to obtain sensitivity and fog data. The sensitivity was relatively determined taking an optical density of (fog+0.3) as a standard point.

| Formulation of Developing Solution: | |
|---|---|
| Metol (p-methylaminophenol sulfate) | 0.31 g |
| Anhydrous Sodium Sulfite | 39.6 g |
| Hydroquinone | 6.0 g |
| Anhydrous Sodium Carbonate | 18.7 g |
| Potassium Bromide | 0.86 g |
| Citric Acid | 0.68 g |
| Potassium Metabisulfite | 1.5 g |
| Water to make | 1 liter |

The results thus obtained are tabulated in Table 1 as relative values. The results show that the combination according to the present invention provided excellent light-sensitive materials having higher sensitivity and forming less fog than the light-sensitive materials containing dye alone and the comparative samples.

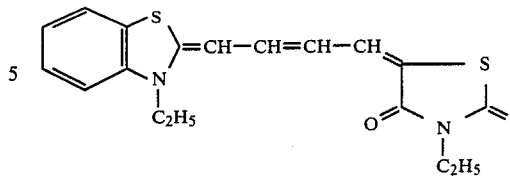

Dye A

EXAMPLE 2

Samples were prepared in the same manner as described in Example 1 except that silver chloride having a mean grain diameter of 0.26μ was used as silver halide grains.

These samples stored for 3 days at high temperature and high humidity (50° C., 80% RH) and the same samples stored for 4 days at room temperature (20° C., 60% RH) (for comparison) were subjected to the same exposure, development, stopping, fixing, washing with water, and drying and then density measurement to determine sensitivity and fog value as described in Example 1.

The results thus obtained are tabulated in Table 2.

TABLE 1

| No. | Sensitizing Dye and Amount Used ($\times 10^{-6}$ mol/kg emulsion) | Sodium Bromide Amount Used (mg/kg emulsion) | Relative Sensitivity | Fog |
|---|---|---|---|---|
| 1 | I-1 | 50 | 0 | 100 (standard) | 0.04 |
| 2 | " | 50 | 40 | 107 | 0.04 |
| 3 | " | 50 | 80 | 120 | 0.04 |
| 4 | I-3 | 50 | 0 | 100 (standard) | 0.04 |
| 5 | " | 50 | 40 | 107 | 0.04 |
| 6 | " | 50 | 80 | 117 | 0.04 |
| 7 | I-5 | 50 | 0 | 100 (standard) | 0.04 |
| 8 | " | 50 | 40 | 110 | 0.04 |
| 9 | " | 50 | 80 | 126 | 0.04 |
| 10 | I-17 | 50 | 0 | 100 (standard) | 0.04 |
| 11 | " | 50 | 40 | 105 | 0.04 |
| 12 | " | 50 | 80 | 115 | 0.04 |
| 13 | II-2 | 50 | 0 | 100 (standard) | 0.04 |
| 14 | " | 50 | 40 | 110 | 0.04 |
| 15 | " | 50 | 80 | 115 | 0.04 |
| 16 | II-6 | 50 | 0 | 100 (standard) | 0.04 |
| 17 | " | 50 | 40 | 115 | 0.04 |
| 18 | " | 50 | 80 | 129 | 0.04 |
| 19 (comparison) | Dye A | 50 | 0 | 100 (standard) | 0.06 |
| 20 (comparison) | " | 50 | 40 | 98 | 0.06 |
| 21 (comparison) | " | 50 | 80 | 93 | 0.06 |

TABLE 2

| No. | Sensitizing Dye and Amount Used ($\times 10^{-6}$ mol/kg emulsion) | Sodium Bromide Amount Used (mg/kg emulsion) | Stored at Room Temperature (20° C., 60% RH) | | Stored at High Temperature and High Humidity (50° C., 80% RH) | |
|---|---|---|---|---|---|---|
| | | | Relative Sensitivity | Fog | Relative Sensitivity | Fog |
| 1 | I-6 | 75 | — | 100 (standard) | 0.04 | 50 | 0.07 |
| 2 | | 75 | 50 | 110 | 0.04 | 107 | 0.05 |
| 3 | | 75 | 75 | 126 | 0.04 | 126 | 0.04 |
| 4 | I-18 | 75 | — | 100 (standard) | 0.04 | 45 | 0.06 |
| 5 | | 75 | 60 | 120 | 0.04 | 115 | 0.04 |
| 6 | II-3 | 75 | — | 100 (standard) | 0.04 | 60 | 0.06 |
| 7 | | 75 | 60 | 135 | 0.04 | 132 | 0.04 |
| 8 | II-10 | 75 | — | 100 (standard) | 0.04 | 62 | 0.06 |
| 9 | | 75 | 60 | 129 | 0.04 | 126 | 0.04 |

It is apparent from the results shown in Table 2 that the combination according to the present invention provides not only high sensitivity but also excellent storage stability in that the decrease in sensitivity and the increase in fog are small when the photographic light-sensitive materials are stored at high temperature and high humidity.

EXAMPLE 3

Silver halide grains were precipitated by a double jet method, physically ripened, desalted and then subjected to gold sensitization and sulfur sensitization to obtain a silver chlorobromide emulsion (containing 30 mol% of bromide and having a mean grain diameter of $0.3\mu$).

To 1 kg portions of this emulsion, a methanol solution of a sensitizing dye and then an aqueous solution of potassium bromide were added in an amount as described in Table 3 below, respectively. Then, 30 ml of a 1.0 wt% methanol solution of Compound (III-5), 5 ml of a 1.0 wt% methanol solution of 4-hydroxy-6-methyl-1,3,3a,7-tetraazaindene and 40 ml of a 1.0 wt% aqueous solution of sodium dodecylbenzenesulfonate were added thereto, followed by stirring at 40° C.

A part of the emulsion was collected after being maintained at 40° C. for 1 hour and another part of the emulsion was collected after being maintained at 40° C. for 16 hours, and to each of them was added 30 ml of 1.0 wt% aqueous solution of 2-hydroxy-3,5-dichlorotriazine sodium salt, and the resulting emulsion was coated on a polyethylene terephthalate film support. The film support has on the opposite side to that for coating the emulsion a layer which was prepared by coating a gelatin solution containing Dye B described below in an amount for obtaining the optical density of 1.0 at 760 nm, a surfactant and a hardener.

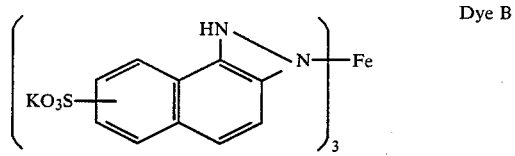

Dye B

These samples were subjected to the same exposure, development, stopping, fixing, washing with water and drying and then density measurement to determine sensitivity and fog value as described in Example 1. The standard point for measuring the sensitivity was a point of fog+1.5.

The results thus obtained are shown in Table 3.

It is apparent from the results shown in Table 3 that the combination according to the present invention causes less desensitization and fog formation than the independent use of the dye when the emulsion was stored in a solution state before coating.

EXAMPLE 4

Silver halide grains were precipitated by a double jet method, physically ripened, desalted and then subjected to gold sensitization and sulfur sensitization to obtain a silver chloroiodobromide emulsion (containing 23 mol% of bromide and 0.05 mol% of iodide, and having a mean grain diameter of $0.25\mu$). At the time of preparation of silver halide grains, $5 \times 10^{-7}$ mol per mol of silver of rhodium and $3 \times 10^{-7}$ mol per mol of silver of iridium were added, respectively.

1 kg portions of this emulsion were weighed and, after heating to 40° C. to dissolve, a methanol solution of a sensitizing dye and then an aqueous solution of potassium bromide were added thereto in an amount as described in Table 4 below, respectively. Then, 60 ml of a 0.5 wt% methanol solution of Compound (III-5), 50 ml of a 0.2 wt% methanol solution of Compound (IV-3), 430 mg of polyalkylene oxide compound (P-21) and 1.2 g of sodium dodecylbenzenesulfonate were added with stirring and further, 30 g of a polymer latex as described in Japanese Patent Publication No. 5331/70 and a hardener were added. The resulting mixture was coated on a polyethylene terephthalate film having the same antihalation layer as described in Example 3 on the opposite side at a silver coated amount of 4.0 g per m².

Parts of these samples were stored for 3 days at high temperature and high humidity (50° C., 75% RH) and another parts of the same samples were stored for 3 days at room temperature (20° C., 60% RH) (for comparison).

Each of these samples was brought into contact with a gray contact screen for negative (made by Dainippon Screen Mfg. Co., Ltd.; 150 L/inch) and exposed using a semiconductor laser having a wavelength of 780 nm through a step wedge of 0.1 (log E) in step difference. After exposure, these samples were developed at 27° C. for 100 seconds using a developing solution of the formulation described below. The sensitivity was a relative value determined from a reciprocal of an exposure amount necessary for obtaining 50% halftone dots.

| Formation of Developing Solution: | |
|---|---|
| Hydroquinone | 15 g |
| Adduct of Formaldehyde and Sodium | 50 g |

TABLE 3

| | Sensitizing Dye and Amount Used | Potassium Bromide Amount Used | Storage Time of Emulsion Solution at 40° C. | | | |
|---|---|---|---|---|---|---|
| | | | 1 Hour | | 16 Hours | |
| No. | ($\times 10^{-6}$ mol/kg emulsion) | (mg/kg emulsion) | Relative Sensitivity | Fog | Relative Sensitivity | Fog |
| 1 | I-2 | 70 | — | 100 (standard) | 0.04 | 52 | 0.06 |
| 2 | " | 70 | 60 | 123 | 0.04 | 115 | 0.04 |
| 3 | I-12 | 70 | — | 100 (standard) | 0.04 | 58 | 0.06 |
| 4 | " | 70 | 60 | 126 | 0.04 | 117 | 0.04 |
| 5 | II-5 | 50 | — | 100 (standard) | 0.04 | 71 | 0.06 |
| 6 | " | 50 | 60 | 117 | 0.04 | 112 | 0.04 |
| 7 | II-12 | 65 | — | 100 (standard) | 0.04 | 74 | 0.05 |
| 8 | " | 65 | 60 | 129 | 0.04 | 123 | 0.04 |

| Formation of Developing Solution: | |
|---|---|
| Bisulfite | |
| Potassium Carbonate | 30 g |
| Sodium Sulfite | 2.5 g |
| Potassium Bromide | 2.0 g |
| Boric Acid | 5.0 g |
| Sodium Hydroxide | 3.0 g |
| Triethylene Glycol | 40 g |
| EDTA.2 Na | 1.0 g |
| Water to make | 1,000 ml |

The results thus obtained are shown in Table 4.

It is apparent from the results shown in Table 4 that the combination according to the present invention

TABLE 4

| No. | Sensitizing Dye and Amount Used ($\times 10^{-6}$ mol/kg emulsion) | Potassium Bromide Amount Used (mg/kg emulsion) | Stored at Room Temperature (20° C., 60% RH) Relative Sensitivity | Fog | Stored at High Temperature and High Humidity (50° C., 75% RH) Relative Sensitivity | Fog |
|---|---|---|---|---|---|---|
| 1 | I-11 | 60 | — | 100 (standard) | 0.05 | 93 | 0.06 |
| 2 | | 60 | 35 | 120 | 0.05 | 117 | 0.05 |
| 3 | | 60 | 70 | 129 | 0.04 | 129 | 0.04 |
| 4 | I-19 | 60 | — | 100 (standard) | 0.05 | 85 | 0.07 |
| 5 | | 60 | 35 | 123 | 0.05 | 117 | 0.05 |
| 6 | | 60 | 70 | 138 | 0.05 | 132 | 0.05 |
| 7 | II-7 | 60 | — | 100 (standard) | 0.05 | 93 | 0.05 |
| 8 | | 60 | 35 | 115 | 0.05 | 112 | 0.05 |
| 9 | | 60 | 70 | 132 | 0.05 | 132 | 0.05 | provides not only high sensitivity but also excellent storage stability in that the decrease in sensitivity and the increase in fog are small when the photographic light-sensitive materials are stored at high temperature and high humidity.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive material comprising a support having thereon a silver halide emulsion layer which comprises silver halide grains containing at least silver chloride and spectrally sensitized to infrared rays with at least one dye selected from a tricarbocyanine dye and a dicarbocyanine dye having a 4-quinoline nucleus, wherein the silver halide emulsion layer contains from 0.0003 mol to 0.01 mol per mol of silver of a water-soluble bromide.

2. A silver halide photographic light-sensitive material as claimed in claim 1, wherein an amount of the silver chloride in the silver halide grains is at least 1 mol%.

3. A silver halide photographic light-sensitive material as claimed in claim 1, wherein a mean diameter of the silver halide grains is from about 0.04 to about 4μ.

4. A silver halide photographic light-sensitive material as claimed in claim 1, wherein the silver halide emulsion is a monodispersed type silver halide emulsion.

5. A silver halide photographic light-sensitive material as claimed in claim 1, wherein the water-soluble bromide is selected from ammonium bromide, potassium bromide, sodium bromide and lithium bromide.

6. A silver halide photographic light-sensitive material as claimed in claim 1, wherein the water-soluble bromide is an organic bromide selected from tetraethylammonium bromide and ethyl pyridinium bromide.

7. A silver halide photographic light-sensitive material as claimed in claim 1, wherein the tricarbocyanine dye is represented by the following general formula (Ia) or (Ib):

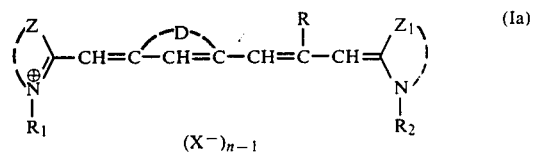

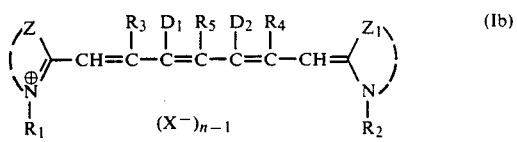

wherein $R_1$ and $R_2$, which may be the same or different, each represents an alkyl group or a substituted alkyl group; R represents a hydrogen atom, a methyl group, a methoxy group or an ethoxy group; $R_3$ and $R_4$, which may be the same or different, each represents a hydrogen atom, a lower alkyl group, a lower alkoxy group, a phenyl group or a benzyl group; $R_5$ represents a hydrogen atom, a lower alkyl group, a lower alkoxy group, a phenyl group, a benzyl group or

wherein $W_1$ and $W_2$ each represents a substituted or unsubstituted alkyl group or a substituted or unsubstituted aryl group or $W_1$ and $W_2$ may be bonded to each other to form a 5-membered or 6-membered nitrogen-containing heterocyclic ring; D represents atoms necessary for completing a divalent ethylene bond which may be substituted; $D_1$ and $D_2$ each represents a hydrogen atom or $D_1$ and $D_2$ may be bonded to each other to form a divalent ethylene bond having the same meaning as defined for D above; Z and $Z_1$ each represents nonmetallic atoms necessary for completing a 5-membered or 6-membered nitrogen-containing heterocyclic ring; X represents an acid anion; and n represents 1 or 2.

8. A silver halide photographic light-sensitive material as claimed in claim 7, wherein a substituent for the substituted alkyl group represented by $R_1$ or $R_2$ is a carboxy group, a sulfo group, a cyano group, a halogen atom, a hydroxy group, an alkoxycarbonyl group, an alkoxy group, an aryloxy group, an acyloxy group, an acyl group, a carbamoyl group, a sulfamoyl group or an aryl group.

9. A silver halide photographic light-sensitive material as claimed in claim 7, wherein the 5-membered or 6-membered nitrogen-containing heterocyclic ring is selected from a thiazole nucleus, a selenazole nucleus, an oxazole nucleus, a quinoline nucleus, a 3,3-dialkylindolenine nucleus, an imidazole nucleus and a pyridine nucleus.

10. A silver halide photographic light-sensitive material as claimed in claim 9, wherein the heterocyclic ring is a thiazole nucleus or an oxazole nucleus.

11. A silver halide photographic light-sensitive material as claimed in claim 9, wherein the heterocyclic ring is a benzothiazole nucleus, a naphthothiazole nucleus, a naphthoxazole nucleus or a benzoxazole nucleus.

12. A silver halide photographic light-sensitive material as claimed in claim 1, wherein the dicarbocyanine dye having a 4-quinoline nucleus is represented by the following general formula (II):

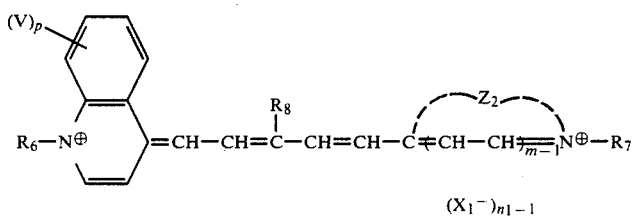

(II)

wherein $R_6$ and $R_7$, which may be the same or different, each represents an alkyl group or a substituted alkyl group; $R_8$ represents a hydrogen atom, a lower alkyl group, a lower alkoxy group, a phenyl group or a benzyl group; V represents a hydrogen atom, a lower alkyl group, an alkoxy group, a halogen atom or a substituted alkyl group; $Z_2$ represents non-metallic atoms necessary for completing a 5-membered or 6-membered nitrogen-containing heterocyclic ring; $X_1$ represents an acid anion; and m, $n_1$ and p each represents 1 or 2.

13. A silver halide photographic light-sensitive material as claimed in claim 12, wherein a substituent for the substituted alkyl group represented by $R_6$ or $R_7$ is a carboxy group, a sulfo group, a cyano group, a halogen atom, a hydroxy group, an alkoxycarbonyl group, an alkoxy group, an aryloxy group, an acyloxy group, an acyl group, a carbamoyl group, a sulfamoyl group or an aryl group.

14. A silver halide photographic light-sensitive material as claimed in claim 12, wherein $R_8$ represents a lower alkyl group or a benzyl group.

15. A silver halide photographic light-sensitive material as claimed in claim 1, wherein the tricarbocyanine dye and/or dicarbocyanine dye having a 4-quinoline nucleus is present in an amount of $5 \times 10^{-7}$ mol to $5 \times 10^{-3}$ mol per mol of silver halide in the emulsion layer.

16. A silver halide photographic light-sensitive material as claimed in claim 1, wherein the silver halide photographic emulsion further contains a compound represented by the following general formula (III):

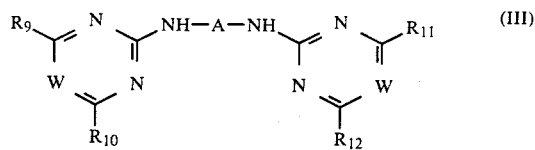

wherein A represents a divalent aromatic residue; $R_9$, $R_{10}$, $R_{11}$ and $R_{12}$, which may be the same or different, each represents a hydrogen atom, a hydroxy group, a lower alkyl group, an alkoxy group, an aryloxy group, a halogen atom, a heterocyclic ring nucleus, an alkylthio group, a heterocyclylthio group, an arylthio group, an amino group, a substituted or unsubstituted alkylamino group, a substituted or unsubstituted arylamino group, a heterocyclylamino group, a substituted or unsubstituted aralkylamino group, an aryl group, or a mercapto group, provided that at least one of A, $R_9$, $R_{10}$, $R_{11}$ and $R_{12}$ possesses a sulfo group; and W represents $-CH=$ or $-N=$.

17. A silver halide photographic light-sensitive material as claimed in claim 16, wherein W represents $-CH=$.

18. A silver halide photographic light-sensitive material as claimed in claim 16, wherein the compound represented by the general formula (III) is present in an amount of about 0.01 g to 5 g per mol of silver halide in the emulsion layer.

19. A silver halide photographic light-sensitive material as claimed in claim 16, wherein the ratio by weight of the sensitizing dye to the compound represented by the general formula (III) is in a range from 1/1 to 1/100.

20. A silver halide photographic light-sensitive material as claimed in claim 1, wherein the silver halide photographic emulsion further contains a compound represented by the following general formula (IV):

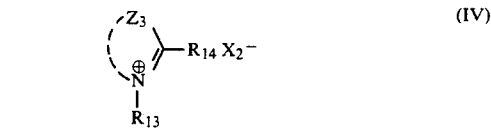

wherein $Z_3$ represents non-metallic atoms necessary for completing a 5-membered or 6-membered nitrogen-containing heterocyclic ring; $R_{13}$ represents a hydrogen atom, an alkyl group or an alkenyl group; $R_{14}$ represents a hydrogen atom or a lower alkyl group; and $X_2$ represents an acid anion.

21. A silver halide photographic light-sensitive material as claimed in claim 20, wherein the 5-membered or 6-membered nitrogen-containing heterocyclic ring is selected from a thiazolium, an oxazolium, an imidazolium and a selenazolium.

22. A silver halide photographic light-sensitive material as claimed in claim 21, wherein the heterocyclic ring is a thiazolium.

23. A silver halide photographic light-sensitive material as claimed in claim 21, wherein the heterocyclic ring is a benzothiazolium or a naphthothiazolium.

24. A silver halide photographic light-sensitive material as claimed in claim 20, wherein the compound represented by the general formula (IV) is present in an amount of about 0.01 g to about 5 g per mol of silver halide in the emulsion layer.

25. A silver halide photographic light-sensitive material as claimed in claim 20, wherein the ratio by weight of the sensitizing dye to the compound represented by the general formula (IV) is in the range of from 1/1 to 1/300.

26. A silver halide photographic light-sensitive material as claimed in claim 1, wherein the silver halide photographic material further contains a dye which absorbs light having a wavelength range of 750 nm or longer.

27. A silver halide photographic light-sensitive material as claimed in claim 26, wherein the dye is selected from an oxonol dye, a hemioxonol dye, a merocyanine dye, a cyanine dye and azo dye.

28. A silver halide photographic light-sensitive material as claimed in claim 26, wherein the dye is selected from dyes represented by the following general formulae (Va), (Vb), (Vc) and (Vd):

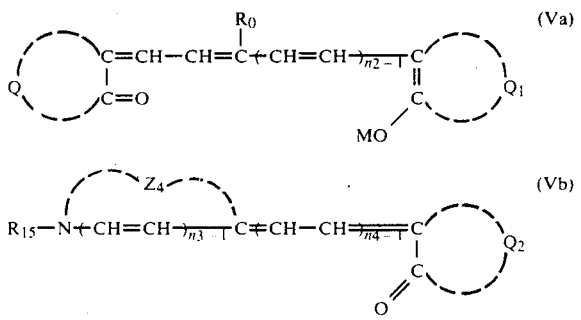

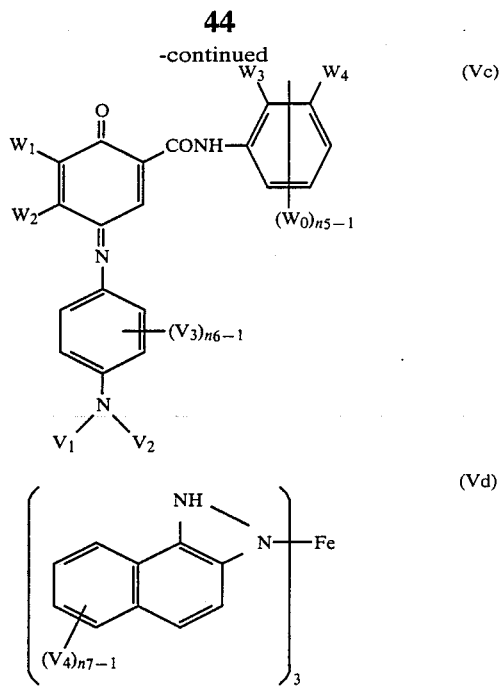

wherein Q and $Q_1$, which may be the same or different, each represents atoms necessary for completing pyrazolone, barbituric acid, thiobarbituric acid, isooxazolone, 3-oxythionaphthene or 1,3-indanedione;

$Q_2$ represents atoms necessary for completing pyrazolone, barbituric acid, thiobarbituric acid, isooxazolone, 3-oxynaphthene, 1,3-indanedione, 2-thiooxazolidione, rhodanine or thiohydantoin;

$Z_4$ represents atoms necessary for completing benzothiazole, naphthothiazole, benzoxazole or naphthoxazole;

$R_0$ represents a hydrogen atom, a halogen atom, a lower alkyl group;

$R_{15}$ represents a substituted or unsubstituted alkyl group;

$W_0$, $W_1$, $W_2$, $W_3$ and $W_4$ each represents a hydrogen atom, an alkyl group, a substituted alkyl group, a nitro group, a cyano group, a halogen atom, an alkoxy group, a sulfo group or a carboxy group, or $W_1$ and $W_2$ or $W_3$ and $W_4$ may be bonded to each other to form a benzene ring;

$V_1$, $V_2$ and $V_3$, which may be the same or different, each represents an alkyl group or a substituted alkyl group;

$V_4$ represents a sulfo group or a carboxy group;

M represents a hydrogen atom or a cation capable of imparting water solubility;

$n_2$ represents 2 or 3;

$n_3$ represents 1 or 2;

$n_4$ represents 3 or 4;

$n_5$ and $n_6$ each represents 1, 2 or 3; and $n_7$ represents 2, 3 or 4.

29. A silver halide photographic light-sensitive material as claimed in claim 28, wherein the dye is represented by the general formula (Vd).

30. A silver halide photographic light-sensitive material as claimed in claim 7, wherein the tricarbocyanine dye is represented by the general formula (Ia).

31. A silver halide photographic light-sensitive material as claimed in claim 16, wherein the silver halide photographic emulsion further contains a compound represented by the general formula (IV) as defined in claim 20.

32. A silver halide photographic light-sensitive material as claimed in claim 1, wherein the water-soluble bromide is added to the silver halide emulsion after chemical ripening of the silver halide emulsion.

* * * * *